(12) United States Patent
Bergman et al.

(10) Patent No.: US 9,790,012 B2
(45) Date of Patent: Oct. 17, 2017

(54) INCREMENTALLY STRETCHED FILMS WITH TAILORED PROPERTIES AND METHODS FOR MAKING THE SAME

(71) Applicant: The Glad Products Company, Oakland, CA (US)

(72) Inventors: Carl L. Bergman, Loveland, OH (US); Kyle R. Wilcoxen, Willowbrook, IL (US); Michael G. Borchardt, Willowbrook, IL (US); Stacie A. Palmer, Willowbrook, IL (US); Robert T. Dorsey, Willowbrook, IL (US); Jason R. Maxwell, Willowbrook, IL (US)

(73) Assignee: The Glad Products Company, Oakland, CA (US)

( * ) Notice: Subject to any disclaimer, the term of this patent is extended or adjusted under 35 U.S.C. 154(b) by 344 days.

(21) Appl. No.: 13/837,469

(22) Filed: Mar. 15, 2013

(65) Prior Publication Data

US 2013/0202853 A1    Aug. 8, 2013

Related U.S. Application Data

(63) Continuation-in-part of application No. 13/760,921, filed on Feb. 6, 2013, which is a continuation-in-part (Continued)

(51) Int. Cl.
*B65D 65/22* (2006.01)
*B65D 65/40* (2006.01)
(Continued)

(52) U.S. Cl.
CPC ............. *B65D 65/406* (2013.01); *B29C 55/18* (2013.01); *B32B 3/28* (2013.01); *B32B 27/08* (2013.01);
(Continued)

(58) Field of Classification Search
CPC ........... B32B 27/08; B32B 27/32; B32B 3/28; B32B 3/30; B32B 2250/02;
(Continued)

(56) References Cited

U.S. PATENT DOCUMENTS 4,251,585 A * 2/1981 Schwarz ............... B29C 55/023
156/229
5,003,752 A  4/1991 Matsumoto
(Continued)

FOREIGN PATENT DOCUMENTS

WO  WO 2008082915 A1 *  7/2008

OTHER PUBLICATIONS

Gent et al. "Tear strength of oriented crystalline polymers." Journal of Materials Science vol. 21 issue 1, pp. 355-363. Jan. 1986.*

*Primary Examiner* — Nancy Johnson
(74) *Attorney, Agent, or Firm* — Thomas C. Feix

(57) ABSTRACT

Methods of enhancing one or more physical properties of a thermoplastic film include incrementally stretching thermoplastic films in the machine direction and/or transverse direction. In one or more implementations, methods of incrementally stretching thermoplastic films include reducing the gauge of the films while maintaining or increasing a ratio of the machine direction to transverse direction resistance to tear. The methods can involve cold stretching the films and imparting rib patterns into the film. The linear ribs can have alternating thick and thin gauges.

20 Claims, 13 Drawing Sheets

Related U.S. Application Data of application No. 12/843,722, filed on Jul. 26, 2010, now abandoned, application No. 13/837,469, which is a continuation-in-part of application No. 13/190,677, filed on Jul. 26, 2011, which is a continuation-in-part of application No. 13/189,772, filed on Jul. 25, 2011, now Pat. No. 8,865,289.

(60) Provisional application No. 61/365,412, filed on Jul. 19, 2010.

(51) Int. Cl.
  *B65D 83/08* (2006.01)
  *B32B 27/08* (2006.01)
  *B32B 27/32* (2006.01)
  *B32B 3/28* (2006.01)
  *B29C 55/18* (2006.01)

(52) U.S. Cl.
  CPC .............. *B32B 27/32* (2013.01); *B65D 65/22* (2013.01); *B65D 83/0882* (2013.01); *B32B 2250/02* (2013.01); *B32B 2250/242* (2013.01); *B32B 2255/10* (2013.01); *B32B 2255/26* (2013.01); *B32B 2307/5825* (2013.01); *B32B 2553/00* (2013.01); *Y10T 428/2457* (2015.01)

(58) Field of Classification Search
  CPC .......... B32B 2250/242; B32B 2255/26; B32B 2255/10; B32B 2553/00; B65D 65/22; B65D 65/02; B65D 65/403; Y10T 428/2457; Y10T 428/24479; Y10T 428/2446; Y10T 428/24355
  See application file for complete search history.

(56) References Cited

U.S. PATENT DOCUMENTS

| | | |
|---|---|---|
| 5,161,349 A | 11/1992 | Lancaster, III et al. |
| 5,195,296 A | 3/1993 | Matsumoto |
| 5,399,426 A | 3/1995 | Koch et al. |
| 5,419,934 A | 5/1995 | Wilson |
| 5,516,475 A | 5/1996 | Wilson |
| 5,569,693 A | 10/1996 | Doshi et al. |
| 5,617,707 A | 4/1997 | Simmons |
| 5,948,493 A | 9/1999 | Groeger |
| 6,299,966 B1 | 10/2001 | Bonke et al. |
| 6,521,338 B1 | 2/2003 | Maka |
| 6,605,172 B1 * | 8/2003 | Anderson et al. ............ 156/199 |
| 6,692,805 B2 | 2/2004 | Bonke |
| 2003/0211270 A1 | 11/2003 | McReynolds et al. |
| 2007/0122599 A1 | 5/2007 | Furlong |

* cited by examiner

INCREMENTALLY STRETCHED FILMS WITH TAILORED PROPERTIES AND METHODS FOR MAKING THE SAME

CROSS-REFERENCE TO RELATED APPLICATIONS

This application is a continuation-in-part application of U.S. patent application Ser. No. 13/760,921, filed on Feb. 6, 2013, which is a continuation-in-part application of U.S. application Ser. No. 12/843,722, filed Jul. 26, 2010, which claims the benefit of U.S. Provisional Application No. 61/365,412, filed Jul. 19, 2010. This application is also a continuation-in-part application of U.S. patent application Ser. No. 13/190,677, filed Jul. 26, 2011, which is a continuation-in-part application of U.S. patent application Ser. No. 13/189,772, filed Jul. 25, 2011. The contents of each of the foregoing patent application are hereby incorporated by reference in their entirety.

BACKGROUND OF THE INVENTION

1. The Field of the Invention

The present invention relates generally to thermoplastic films. Specifically, the invention relates to incrementally stretched thermoplastic films with tailored physical properties, and to methods of incrementally stretching thermoplastic films to tailor the physical properties thereof.

2. Background and Relevant Art

Thermoplastic films are a common component in various commercial and consumer products. For example, food wraps, grocery bags, trash bags, sacks, and packaging materials are products that are commonly made from thermoplastic films. Additionally, feminine hygiene products, baby diapers, adult incontinence products, and many other products include thermoplastic films to one extent or another.

Thermoplastic films have a variety of different strength parameters that manufacturers of products incorporating a thermoplastic film component may attempt to manipulate to ensure that the film is suitable for use its intended use. For example, manufacturers may attempt to increase or otherwise control the tensile strength of a thermoplastic film. The tensile strength of a thermoplastic film is the maximum stress that a film can withstand while being stretched before it fails. Another strength parameter that manufacturers may want to increase or otherwise control is tear resistance. The tear resistance of a thermoplastic film is the amount of force required to propagate or enlarge a tear that has already been created in a film. Still further, a manufacturer may want to increase or otherwise control a film's impact resistance.

One way manufacturers may attempt to control or change the material properties of a thermoplastic film is by stretching the film. Common directions of stretching include "machine direction" or "MD" and "transverse direction" or "TD" stretching. As used herein, the term "machine direction" refers to the direction along the length of the film, or in other words, the direction of the film as the film is formed during extrusion and/or coating. As used herein, the term "transverse direction" refers to the direction across the film or perpendicular to the machine direction.

Common ways of stretching film in the machine direction include machine direction orientation ("MDO") and incremental stretching. MDO involves stretching the film between pairs of smooth rollers. Commonly MDO involves running a film through the nips of sequential pairs of smooth rollers. The first pair of rollers rotates at a speed less than that of the second pair of rollers. The difference in speed of rotation of the pairs of rollers can cause the film between the pairs of rollers to stretch. The ratio of the roller speeds will roughly determine the amount that the film is stretched. For example, if the first pair of rollers is rotating at 100 feet per minute ("fpm") and the second pair of rollers is rotating at 500 fpm, the rollers will stretch the film to roughly five times its original length. MDO stretches the film continuously in the machine direction and is often used to create an oriented film.

Incremental stretching of thermoplastic film, on the other hand, typically involves running the film between grooved or toothed rollers. The grooves or teeth on the rollers intermesh and stretch the film as the film passes between the rollers. Incremental stretching can stretch a film in many small increments that are evenly spaced across the film. The depth at which the intermeshing teeth engage can control the degree of stretching. Often, incremental stretching of films is referred to as ring rolling.

One common use of thermoplastic films is as food wraps. There are many physical properties that desirable in food grade wrap film. For example, it is desirable that the film has a high machine-direction tear resistance so as to avoid tearing or failing when being pulled off of a roll or wrapped about a container or food. At the same time, it is desirable that the transverse-direction tear resistance is low enough to allow the film to be easily torn from the roll, such as when the film is brought in contact with a cutter bar as found in the standard containers used for containing and dispensing flexible food grade wrap film.

Additionally, it is desirable for the film to be flexible so that consumers can easily mold the film around a container or object to be covered or wrapped. In addition to the foregoing, in order to allow the film to seal around the container or object, it is desirable that the film be somewhat tacky. At the same time, however, if the film is too tacky, the film can aggressively stick to itself causing blocking. This can make the film difficult to unwind from a roll.

BRIEF SUMMARY OF THE INVENTION

Implementations of the present invention solve one or more of the foregoing or other problems in the art with apparatus and methods for tailoring the physical properties of thermoplastic films by incrementally stretching the films. In particular, one or more implementations of the present invention include TD and/or MD incrementally-stretched films, and products formed therewith. In one or more implementations the type and amount of incremental stretching can allow for the creation of films with one maintained or increased ratios of MD tear resistance to TD tear resistance. Additionally, one or more implementations of the present invention include methods creating textured or unsmooth films that reduce blocking while still allowing for a good seal about a container.

For example, one implementation of an incrementally-stretched thermoplastic film formed by incrementally stretching a flat thermoplastic film can comprise a thermoplastic material. The film can further include a ribbed pattern of thicker and thinner linear ribs extending across the incrementally-stretched thermoplastic film. The incrementally-stretched thermoplastic film can have a ratio of machine-direction tear resistance to transverse-direction tear resistance that is greater than a first ratio of machine-direction tear resistance to transverse-direction tear resistance of the flat thermoplastic film. The film can also have a gauge by weight that is approximately equal to or less than a first gauge by weight of the flat thermoplastic film.

Additionally, another implementation of an incrementally-stretched thermoplastic film can comprise a first set of alternating thicker and thinner linear ribs extending across the thermoplastic film in a first direction. The incrementally-stretched thermoplastic film can comprise a second set of alternating thicker and thinner linear ribs extending across the thermoplastic film in a second direction. The incrementally-stretched thermoplastic film can comprise a machine direction tear resistance and a transverse direction tear resistance. A ratio of the machine direction tear resistance to the transverse direction tear resistance can be greater than about 1.5.

In addition to the forgoing, a method of tailoring one or more physical properties of a thermoplastic film can involve providing a film of a thermoplastic material with a first ratio of machine-direction tear resistance to transverse-direction tear resistance. In particular, the method can involve stretching the film using at a first incremental stretching process and a second incremental stretching process to form an incrementally stretched film. The incrementally-stretched thermoplastic film can have a ratio of machine-direction tear resistance to transverse-direction tear resistance that is equal to or greater than the first ratio of machine-direction tear resistance to transverse-direction tear resistance.

Additional features and advantages of exemplary embodiments of the present invention will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1A:
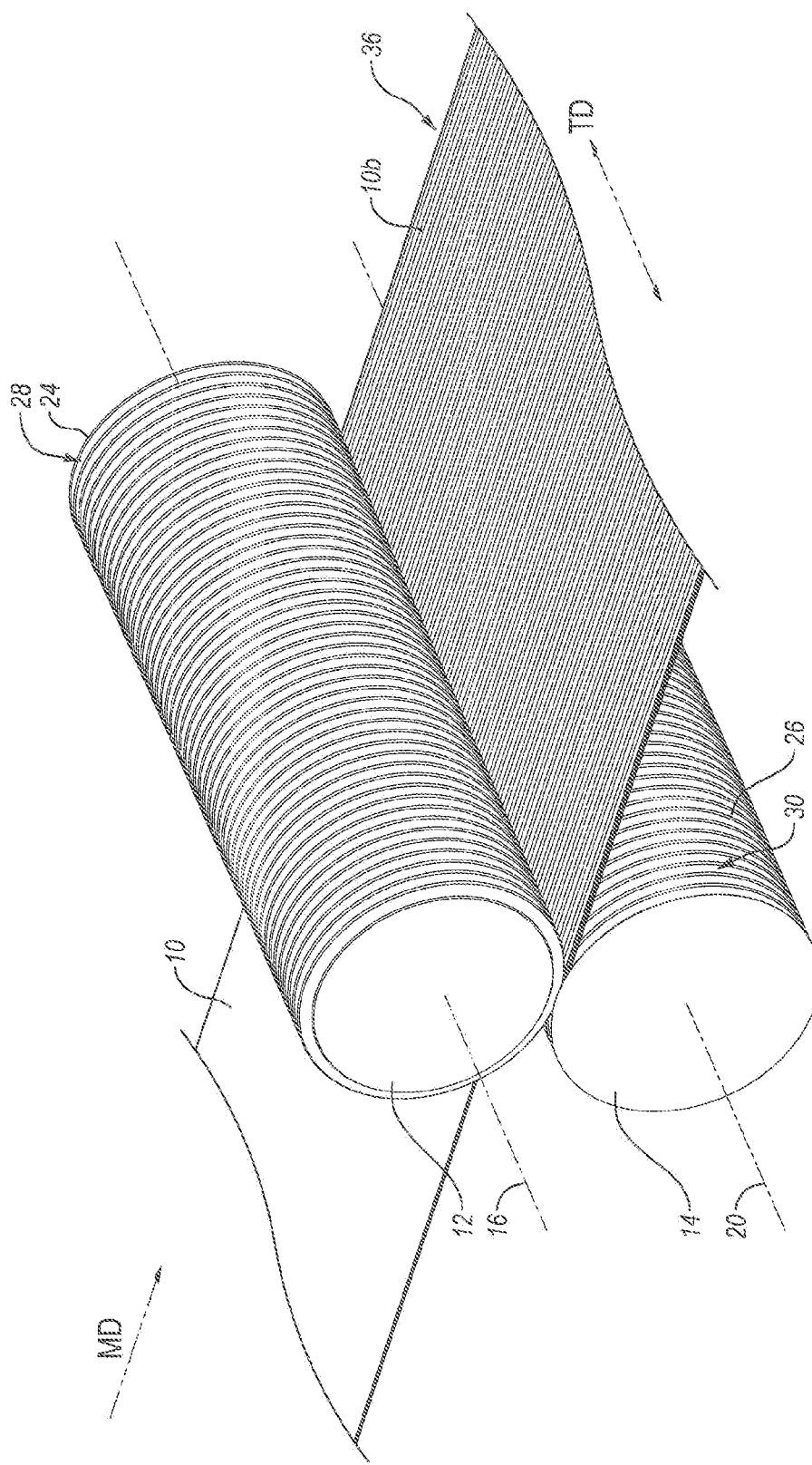
FIG. 1A illustrates a schematic diagram of a flat thermoplastic film being incrementally stretched by TD intermeshing rollers in accordance with one or more implementations of the present invention.

One or more implementations of the present invention include apparatus and methods for tailoring the physical properties of thermoplastic films by incrementally stretching the films. In particular, one or more implementations of the present invention include TD and/or MD incrementally-stretched films, and products formed therewith. In one or more implementations the type and amount of incremental stretching can allow for the creation of films with one maintained or increased ratios of MD tear resistance to TD tear resistance. Additionally, one or more implementations of the present invention include methods creating textured or unsmooth films that reduce blocking while still allowing for a good seal about a container.

Indeed, one or more implementations can provide thermoplastic films, and products made there from, with reduced gauge yet maintained or increased MD tear resistance and reduced TD tear resistance. Still further implementations can provide thermoplastic films, and products made there from, with reduced gauge yet maintained or increased MD tear resistance to TD tear resistance ratios. Thus, one or more implementations can reduce the material needed to produce a product without compromising important material properties. One will appreciate in light of the disclosure herein that such material reductions can provide significant cost savings.

In addition to the foregoing, one or more implementations provide stretched thermoplastic films with physical features that consumers can associate with the improved strength properties. In particular, one or more implementations include thermoplastic films with ribs extending across the film in the transverse and/or machine directions. The ribs can notify a consumer that the thermoplastic film has been processed to increase the strength of the film.

Some consumers may associate thinner films with decreased strength. Indeed, such consumers may feel that they are receiving less value for their money when purchasing thermoplastic film products with smaller gauges. In one or more implementations, a consumer may not readily detect that one or more incrementally stretched films of the present invention have a reduced gauge. In particular, a consumer may associate the thickness of the thermoplastic film with the thicker ribs of an alternating pattern of thick and thin ribs.

As alluded to previously, one or more implementations include methods of incrementally stretching a film with the unexpected result of maintaining or increasing a ratio of MD tear resistance to TD tear resistance. In particular, as will be described in greater detail below, one or more implementations provide synergistic effects when incrementally cold-stretching thermoplastic films. The films of the present invention can undergo one or more film stretching processes under ambient or cold (non-heated) conditions.

Implementations of the present invention that include cold ring-rolling differ significantly from most conventional processes that stretch films under heated conditions. Stretching under ambient or cold conditions in accordance with one or more implementations can constrain the molecules in the film so they are not as easily oriented as under heated conditions. This, in combination with determining the amount of stretch based on one or more of the polymer type, the starting gauge, and the film production type, can provide the unexpected result of maintaining or increasing a ratio of MD tear resistance to TD tear resistance, and provide a reduction in gauge.

Additionally, one or more implementations can provide an incrementally-stretched film with a pattern of alternating thick and thin regions. The pattern of alternating thick and thin ribs can increase the ease of dispensability of the film by reducing blocking of the film. In particular, by reducing the overlapping surface areas of the film that touch when wrapped about a roll, the film can block less. Furthermore, the pattern of alternating thick and thin ribs can increase the cling or ability of the film to wrap about a container. For example, the pattern of alternating thick and thin ribs can help prevent the film from slipping off of a container. Additionally, the alternating thick and thin ribs can provide the film with greater elasticity/flexibility, which cause the film to retract/lock about a container after being stretched about the container.

In addition to the foregoing, incrementally stretching a flat film can decrease the gauge by weight of the film. This can provide a manufacturer with the ability to produce an initially thicker flat film, which can increase production ease. The initially thicker flat film can then be stretched to a thickness suitable for use as food wrap or other products. Thus, implementations of the present can produce a cost effective film by reducing the gauge to reduce material costs, while still providing appropriate tear resistance, blocking, and acceptable feel.

Alternatively to using incremental stretching to reduce the gauge of an initially thicker film, implementations of the present invention include incrementally stretching a film to reduce its gauge while maintaining or increasing properties of the film (e.g., MD tear resistance and reduced TD tear resistance). Thus, one or more implementations can reduce the material needed to produce a product without compromising important material properties. One will appreciate in light of the disclosure herein that such material reductions can provide significant cost savings Furthermore, blown films and certain polymers (such as linear low density polyethylene) are sometimes not used in food wraps due to their increased TD tear resistance. This is despite the fact that linear low density polyethylene is typically cheaper than commonly used materials (such as cast low density polyethylene) in food wraps. One or more implementations of the present invention allow for the use of blown films and/or linear low density polyethylene films or composites thereof. In particular, incrementally stretching such films in accordance with one or more implementations of the present invention can reduce the TD tear resistance and the gauge, making such films suitable for use as food wrap.

Film Materials

As explained in greater detail below, the amount of incremental stretching to achieve the unexpected result of maintaining or increasing the ratio of MD tear resistance to TD tear resistance, or other properties of the film, can be based, at least in part, on the thermoplastic material of the film being stretched. As an initial matter, the thermoplastic material of the films of one or more implementations can include, but are not limited to, thermoplastic polyolefins, including polyethylene and copolymers thereof and polypropylene and copolymers thereof. The olefin based polymers can include the most common ethylene or propylene based polymers such as polyethylene, polypropylene, and copolymers such as ethylene vinylacetate (EVA), ethylene methyl acrylate (EMA) and ethylene acrylic acid (EAA), or blends of such polyolefins.

Other examples of polymers suitable for use as films in accordance with the present invention include elastomeric polymers. Suitable elastomeric polymers may also be biodegradable or environmentally degradable. Suitable elastomeric polymers for the film include poly(ethylene-butene), poly(ethylene-hexene), poly(ethylene-octene), poly(ethylene-propylene), poly(styrene-butadiene-styrene), poly(styrene-isoprene-styrene), poly(styrene-ethylene-butylene-styrene), poly(ester-ether), poly(ether-amide), poly(ethylene-vinylacetate), poly(ethylene-methylacrylate), poly(ethylene-acrylic acid), poly(ethylene butylacrylate), polyurethane, poly(ethylene-propylene-diene), ethylene-propylene rubber.

The examples and description herein below refer to films formed from linear low density polyethylene. The term "linear low density polyethylene" (LLDPE) as used herein is defined to mean a copolymer of ethylene and a minor amount of an olefin containing 4 to 10 carbon atoms, having a density of from about 0.910 to about 0.926, and a melt index (MI) of from about 0.5 to about 10. For example, some examples herein use an octene comonomer, solution phase LLDPE (MI=1.1; ρ=0.920). Additionally, other examples use a gas phase LLDPE, which is a hexene gas phase LLDPE formulated with slip/AB (MI=1.0; ρ=0.920). Still further examples use a gas phase LLDPE, which is a hexene gas phase LLDPE formulated with slip/AB (MI=1.0; ρ=0.926).

One will appreciate that the present invention is not limited to LLDPE, and can include "high density polyethylene" (HDPE), "low density polyethylene" (LDPE), and "very low density polyethylene" (VLDPE), which is also known as "ultra linear low density polyethylene" (ULDPE). LLDPE and ULDPE typically have a density from about 0.87 grams/cubic centimeter (g/cm$^3$) to about 0.94 g/cm$^3$. HDPE has a density from about 0.941 g/cm$^3$ to about 0.965 g/cm$^3$ (i.e., ethylene homopolymer). The density of the LDPE is generally from about 0.9 g/cm$^3$ to about 0.93 g/cm$^3$, preferably from about 0.915 g/cm$^3$ to about 0.925 g/cm$^3$. Each as measured according to ASTM D-92.

Indeed films made from any of the previously mentioned thermoplastic materials or combinations thereof can be suitable for use with the present invention. For example, in at least one implementation, the film comprises LLDPE or mixtures of low density polyethylene LDPE and LLDPE. In suitable embodiments, the film substrate can be made of modified polyolefins. High modulus materials such as polypropylene, HDPE, polyvinylidene vinyl chloride (PVDC or "Saran"), and polyvinyl chloride can comprise one of the layers of the substrate. A high modulus material reduces the tendency for the film to tangle, and tends to correlate with easy tearing of the film, making it easy to cut and dispense. Toughening materials such as LDPE, LLDPE, blends of LDPE and LLDPE, and ethylene vinyl acetate (EVA) can comprise another layer of the substrate. A toughening material can help prevent the film from tearing or splitting when trying to handle the material and, for example, unwrapping the film from a container or object. It is believed that a layer of EVA, ethylene acrylic acid (EAA) or ethylene methacrylic acid (EMA) also helps film stick to food or containers. In a suitable embodiment, the film substrate comprises co-extruded HDPE and LDPE, or co-extruded HDPE, LDPE and polypropylene.

Additives such as antioxidants (e.g., Irgafos™ 168 (a phosphite) and Irganox™ 1010 (a hindered phenolic) both made by Ciba-Geigy Corporation), cling additives (e.g., polyisobutylene (PIB), ethylene vinyl acetate (EVA), amorphous polypropylene, polyterpene, sorbitan monooleate, glycerol monooleate, and microcrystalline wax), antiblock additives, pigments, and the like can also be included in the film substrate.

For food wrap implementations, the film substrate can be made of any flexible polymer as long as it satisfies the Food and Drug Administration (FDA) direct food contact regulations or similar regulations issued in other countries (i.e., it is a "food grade substrate"). In alternative implementations of the present invention can include any flexible or pliable thermoplastic material, which may be formed or drawn into a web or film. Furthermore, the thermoplastic materials may include a single layer or multiple sub layers. Examples of multilayered films suitable for use with one or more implementations of the present invention include coextruded multilayered films, multiple films continuously laminated together, and multiple films partially or discontinuously laminated together. The thermoplastic material may be opaque, transparent, translucent, or tinted. Furthermore, the thermoplastic material may be gas permeable or impermeable.

As used herein, the term "flexible" refers to materials that are capable of being flexed or bent, especially repeatedly, such that they are pliant and yieldable in response to externally applied forces. Accordingly, "flexible" is substantially opposite in meaning to the terms inflexible, rigid, or unyielding. Materials and structures that are flexible, therefore, may be altered in shape and structure to accommodate external forces and to conform to the shape of objects brought into contact with them without losing their integrity. In accordance with further prior art materials, web materials are provided which exhibit an "elastic-like" behavior in the direction of applied strain without the use of added traditional elastic. As used herein, the term "elastic-like" describes the behavior of web materials which when subjected to an applied strain, the web materials extend in the direction of applied strain, and when the applied strain is released the web materials return, to a degree, to their pre-strained condition.

In addition to the foregoing, one will appreciate in light of the disclosure herein that manufacturers may form the films or webs to be used with the present invention using a wide variety of techniques. For example, a manufacturer can form the films using conventional flat or cast extrusion or coextrusion to produce monolayer, bilayer, or multilayer films. Alternatively, a manufacturer can form the films using suitable processes, such as, a blown film process to produce monolayer, bilayer, or multilayer films. If desired for a given end use, the manufacturer can orient the films by trapped bubble, tenterframe, or other suitable process. Additionally, the manufacturer can optionally anneal the films thereafter.

In one or more implementations, the films of the present invention are blown film, or cast film. Blown film and cast film is formed by extrusion. The extruder used can be a conventional one using a die, which will provide the desired gauge. Some useful extruders are described in U.S. Pat. Nos. 4,814,135; 4,857,600; 5,076,988; 5,153,382, each of which are incorporated herein by reference. Examples of various extruders, which can be used in producing the films to be used with the present invention, can be a single screw type modified with a blown film die, an air ring, and continuous take off equipment.

In a blown film process, the die can be an upright cylinder with an annular opening. Rollers can pull molten plastic upward away from the die. An air-ring can cool the film as the film travels upwards. An air outlet can force compressed air into the center of the extruded annular profile, creating a bubble. The air can expand the extruded circular cross section by a multiple of the die diameter. This ratio is called the "blow-up ratio" (BUR). As explained in greater detail below, in one or more implementations, the amount of incremental stretching to achieve the unexpected result of maintaining or increasing the MD tear resistance, while reducing TD tear resistance can be based, at least in part, on the BUR.

Traditionally, cast film processes are the most preferred method of producing the films for food wrap because, by this method, it is easier to create the film (i.e., control the film's properties). The property of the film that is more easily controlled by the cast film process is the gauge variation. That is, typically a manufacturer can more easily maintain the gauge variation of a film within the preferred thickness ranges using a cast film process (as opposed to the blown extrusion process). Controlling the gauge variation in a film during the blown extrusion process can become a particular challenge as the film becomes thinner. This is because the degree of variation is fixed and becomes a greater percentage of the width of the object being extruded as the film becomes thinner.

One or more implementations of the present invention, however, can allow for the use of blown films. In particular, one or more implementations allow for the use of blown films with initially thicker gauges that are later thinned using a stretching process. Additionally or alternatively, in one or more implementations the amount of incremental stretching to maintain or increase the MD tear resistance or other properties of the film can be based, at least in part, on the starting gauge of the film being stretched. As used herein, the term "starting gauge" or "initial gauge" refers to the average distance between the major surfaces of a film before it is incrementally stretched. The films of one or more implementations of the present invention can have a starting gauge between about 0.1 mils to about 20 mils, suitably from about 0.2 mils to about 4 mils, suitably in the range of about 0.3 mils to about 2 mils, suitably from about 0.6 mils to about 1.25 mils, suitably from about 0.9 mils to about 1.1 mils, suitably from about 0.3 mils to about 0.7 mils, and suitably from about 0.4 mils and about 0.6 mils. Additionally, the starting gauge of films of one or more implementations of the present invention may not be uniform. Thus, the starting gauge of films of one or more implementations may vary along the length and/or width of the film.

As used in this patent application, a "mil" is a unit of length, equal to 0.001 inch, or to $2.54 \times 10^{-5}$ meter. Furthermore, it is preferable for the film to have certain Elmendorf tear properties and 2% secant modulus properties, and for the polymers, polymer blends or coextrusions used to manufacture the substrate to be selected accordingly. In the transverse direction of the film, the Elmendorf tear property, or TD tear resistance, is a measure of how easy it will be to dispense a film by cutting it (e.g., with a cutter bar). In the machine direction the Elmendorf tear property, or MD tear resistance, is a measure of how easy it will be for a film to avoid splitting. In the TD tear resistance of a film in one or more implementations will be between about 40 grams/mil and about 200 grams/mil, more suitably between about 40 grams/mil and about 150 grams/mil, and most suitably between about 40 grams/mil and about 100 grams/mil. The MD tear resistance in one or more implementations will be between about 60 grams/mil and about 300 grams/mil, more suitably between about 80 grams/mil and about 300 grams/mil, and most suitably between about 100 grams/mil and about 200 grams/mil. The TD tear resistance is preferably less than or equal to 50% of the MD tear resistance in one or more implementations.

In at least one implementation, a food grade wrap film can additionally comprise a release coating disposed on the surface of the substrate. This additional release coating can provide further protection to the food grade wrap film against the film blocking (i.e., sticking to itself) to facilitate the unwinding of the film by consumers. This release-coating is also helpful during the manufacture of the film since it facilitates the slitting process, namely, the process by which a mill roll is reduced (or separated) into multiple master rolls. This release coating can be made of silicones or carbamates, for example, as long as the substance used conforms with the FDA direct food contact regulations or similar regulations in other countries (i.e., it is a food grade release coating). Suitably, this release coating can comprise a fluorinated copolymer delivered from a water and alcohol blend (e.g., perfluoroalkyl phosphate (also known as Mayzo RA-120W available from Mayzo, Inc.)).

Alternatively, this release coating can comprise an aqueous silicone, an ultraviolet-cured solvent less silicone material, or an electron-beam-cured solventless silicone material. The coating is preferably applied using a direct gravure process using a chrome plated anilox roll, in a dry weight of between about 0.1 grams per square meter and about 0.5 grams per square meter. It is suitably dried at about 180 F.±20 F. Alternatively, release agents can be added directly to the substrate during film extrusion.

The following release agents could be used in alternative implementations by way of example include, but are not limited to: diatomaceous earth, precipitated silica, amorphous silica, fatty amides, ceramic spheres, calcium carbonate and talc. In yet another implementation, the food grade wrap film can contain a pigmented substrate, a pigmented adhesive and/or a pigmented overprinted release. In yet another implementation, a logo can be printed onto the film. It is suitable that, if both a release coating and a logo are to be applied to the film, that the logo should be printed first and the release coating should be applied thereafter to the surface of the substrate. Alternatively, the logo can be incorporated into the pattern of an overprinted release, which can alleviate the step of printing a logo onto the film.

Figure 1B:
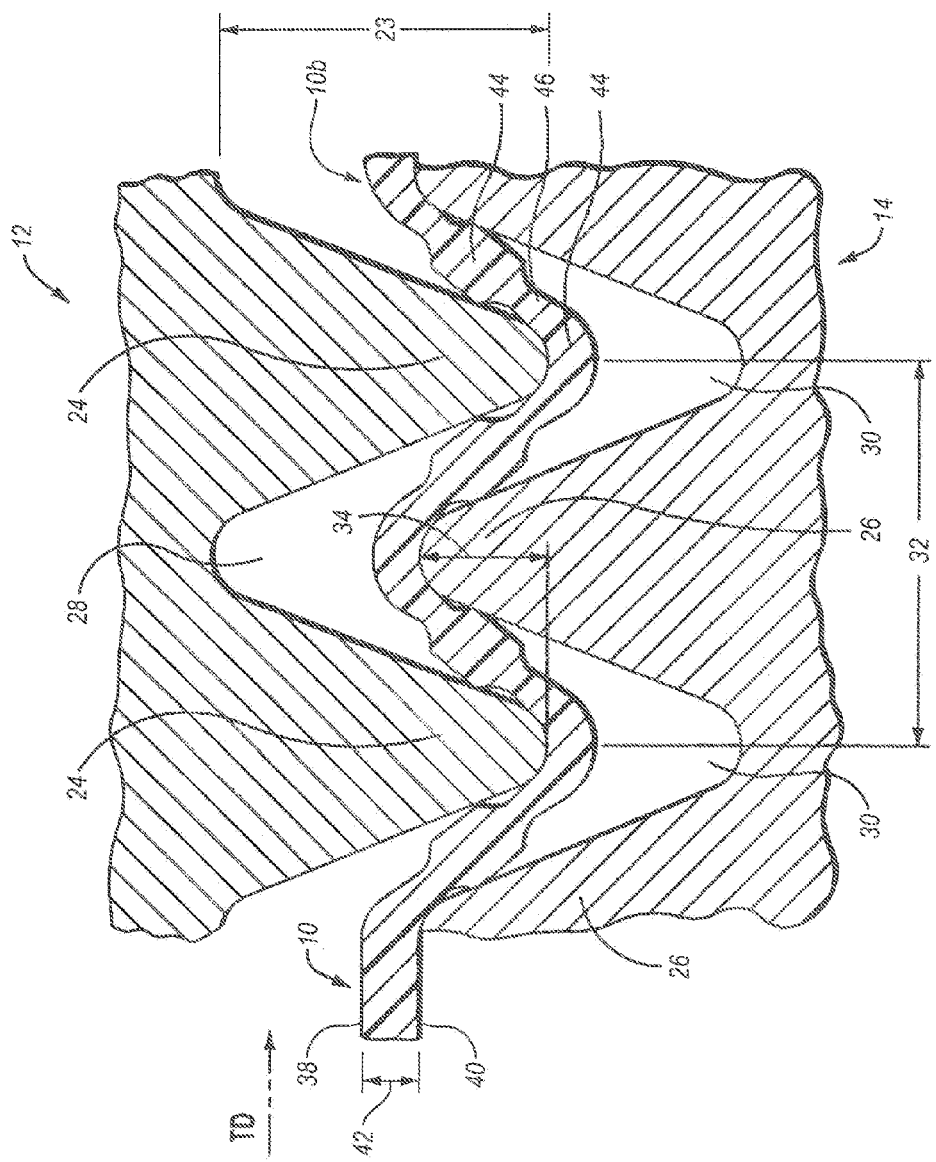
FIG. 1B illustrates an enlarged view of a portion of the flat thermoplastic film passing through the TD intermeshing rollers of FIG. 1A.

Referring now to the Figures, FIGS. 1A and 1B illustrate one exemplary process of incrementally stretching a thermoplastic film in the transverse direction in accordance with an implementation of the present invention. In particular, FIGS. 1A and 1B illustrate a TD ring rolling process that incrementally stretches a thermoplastic flat film 10 by passing the film 10 through a pair of TD intermeshing rollers 12, 14. As explained in greater detail below, the TD ring rolling processes of the present invention can stretch the film 10 in the transverse direction, while maintaining or increasing a ratio of MD tear resistance to TD tear resistance.

As shown by the FIGS. 1A and 1B, the first roller 12 and the second roller 14 can each have a generally cylindrical shape. The TD intermeshing rollers 12, 14 may be made of cast and/or machined metal, such as, steel, aluminum, or any other suitable material. The TD intermeshing rollers 12, 14 can rotate in opposite direction about parallel axes of rotation. For example, FIG. 1A illustrates that the first roller 12 can rotate about a first axis 16 of rotation in a counter-clockwise direction. FIG. 1A also illustrates that the second roller 14 can rotate about a second axis 20 of rotation in a clockwise direction. The axes of rotation 16, 20 can be parallel to the transverse direction and perpendicular to the machine direction.

The TD intermeshing rollers 12, 14 can closely resemble fine pitch spur gears. In particular, the TD intermeshing rollers 12, 14 can include a plurality of protruding ridges 24, 26. The ridges 24, 26 can extend along the TD intermeshing rollers 12, 14 in a direction generally perpendicular to axes of rotation 16, 20. Furthermore, the ridges 24, 26 can extend generally radially outward from the axes of rotation 16, 20. The tips of ridges 24, 26 can have a variety of different shapes and configurations. For example, the tips of the ridges 24, 26 can have a rounded shape as shown in FIG. 1B. In alternative implementations, the tips of the ridges 24, 26 can have sharp angled corners. In another implementation, each of the ridges 24, 26 can be in the shape of an inverted "V." FIGS. 1A and 1B also illustrate that grooves 28, 30 can separate adjacent ridges 24, 26.

The ridges 24 on the first roller 12 can be offset or staggered with respect to the ridges 26 on the second roller 14. Thus, the grooves 28 of the first roller 12 can receive the ridges 26 of the second roller 14, as the TD intermeshing rollers 12, 14 intermesh. Similarly, the grooves 30 of the second roller 14 can receive the ridges 24 of the first roller 12. In one or more implementations, the ridges 24, 26 will not contact each other or transmit rotational torque during an intermeshing stretching operation.

One will appreciate in light of the disclosure herein that the configuration of the ridges 24, 26 and grooves 28, 30 can prevent contact between ridges 24, 26 during intermeshing. Additionally, the configuration of the ridges 24, 26 and grooves 28, 30 can dictate the amount of stretching caused by the TD intermeshing rollers 12, 14.

Referring specifically to FIG. 1B, various features of the ridges 24, 26 and grooves 28, 30 are shown in greater detail. The pitch and depth of engagement of the ridges 24, 26 can determine, at least in part, the amount of incremental stretching created by the TD intermeshing rollers 12, 14. As shown by FIG. 1B, the pitch 32 is the distance between the tips of two adjacent ridges on the same roller. The "depth of engagement" (DOE) 34 is the amount of overlap between ridges 24, 26 of the different TD intermeshing rollers 12, 14 during intermeshing. The ratio of DOE 34 to pitch 32 can determine, at least in part, the amount of stretch imparted by a pair of TD intermeshing rollers 12, 14.

By way of example, the DOE 34 may have a first range from about 0.010 inches (0.025 cm) to about 0.080 inches (0.203 cm), a second range from about 0.02 inches (0.05 cm) to about 0.070 inches (0.178 cm), and a third range from about 0.030 inches (0.076 cm) to about 0.060 inches (0.152 cm). In one or more implementations, the DOE 34 may be about 0.055 inches (0.140 cm). The pitch 32 may have a first range from about 0.02 inches (0.05 cm) to about 0.20 inches (0.51 cm), a second range from about 0.03 inches (0.07 cm) to about 0.10 inches (0.25 cm), and a third range from about 0.035 inches (0.089 cm) to about 0.075 inches (0.191 cm). In one implementation, the pitch 32 may be about 0.040 inches (0.102 cm).

By way of example, the height 23 may have a first range from about 0.02 inches (0.05 cm) to about 0.4 inches (1.02 cm), a second range from about 0.04 inches (0.1 cm) to about 0.2 inches (0.51 cm), and a third range from about 0.06 inches (0.15 cm) to about 0.15 inches (0.38 cm). In one or more implementations, the height 23 may be about 0.08 inches (0.2 cm). To form the desired shape on the cylindrical rollers, the rollers may be cast, ground or etched as appropriate.

As shown by FIG. 1A, the direction of travel of the film 10 through the TD intermeshing rollers 12, 14 is parallel to the machine direction and perpendicular to the transverse direction. As the thermoplastic film 10 passes between the TD intermeshing rollers 12, 14, the ridges 24, 26 can incrementally stretch the film 10 in the transverse direction. In one or more implementations, stretching the film 10 in the transverse direction can reduce the gauge of the film and increase the width of the film 10. In other implementations, the film 10 may rebound after being stretched such that the gauge of the film 10 is not decreased. Furthermore, in some implementations, stretching the film 10 in the transverse direction can reduce the length of the film 10. For example, as the film 10 is widened in the transverse direction, the film's length can be reduced in the machine direction.

In particular, as the film 10 proceeds between the TD intermeshing rollers 12, 14, the ridges 24 of the first roller 12 can push the film 10 into the grooves 30 of the second roller 14 and vice versa. The pulling of the film 10 by the ridges 24, 26 can stretch the film 10. The TD intermeshing rollers 12, 14 may not stretch the film 10 evenly along its width. Specifically, the rollers 12, 14 can stretch the portions of the film 10 between the ridges 24, 26 more than the portions of the film 10 that contact the ridges 24, 26. Thus, the TD intermeshing rollers 12, 14 can impart or form a ribbed pattern 36 into the film 10. As used herein, the terms "impart" and "form" refer to the creation of a desired structure or geometry in a film upon stretching the film that will at least partially retain the desired structure or geometry when the film is no longer subject to any strains or externally applied forces.

As the film 10 is directed between the rollers 12, 14, the ridges 24 on the first roller 12 displace the film material between the ridges 26 on the second roller 14. To facilitate displacement of the film or web between the ridges of the rollers, the rollers may be pressed or forced together, for example, by hydraulic equipment or other equipment, such as, hydraulic actuators. The pressure at which the rollers are pressed together may be in a first range from about 30 PSI (2.04 atm) to about 100 PSI (6.8 atm), a second range from about 60 PSI (4.08 atm) to about 90 PSI (6.12 atm), and a third range from about 75 PSI (5.10 atm) to about 85 PSI (5.78 atm). In one embodiment, the pressure may be about 80 PSI (5.44 atm).

Because the surface area of the film 10 is increased, it will be appreciated that more film can be made from the web material than prior to ring rolling. Thus, one possible result of ring rolling the web material is the cost savings benefit that the process provides. Another possible result of stretching the web out via the interacting rollers is that the molecules of the thermoplastic material may realign or re-orientate themselves. This may result in the web material corresponding to the first rib becoming stronger compared to the same thickness of a web material which was not stretched via the rollers.

As shown in FIGS. 1A and 1B, the ribbed pattern 36 formed by the TD ring rolling process can be visually perceivable. As used herein, the term "visually perceivable" refers to features that are readily discernible to the normal naked eye. In particular, visually perceivable features can be readily discernible to the normal naked eye when a film 10 including the features is subjected to normal use.

In one or more implementations, prior to passing through the TD intermeshing rollers 12, 14, the film 10 may not include a visually perceivable ribbed pattern. For example, FIGS. 1A and 1B illustrate that the flat film 10 (i.e., the film that is yet to pass through the intermeshing rollers 12, 14) can have a substantially flat top surface 38 and substantially flat bottom surface 40. The flat film 10 can have an initial thickness or starting gauge 42 extending between its major surfaces (i.e., the top surface 38 and the bottom surface 40). In at least one implementation, the starting gauge 42 can be substantially uniform along the length of the flat film 10.

For purposes of the present invention, the flat and often un-stretched film 10 need not have an entirely flat top surface 38. Indeed, the top surface 38 can be rough or uneven. Similarly, bottom surface 40 of the un-stretched film 10 can also be rough or uneven. Further, the starting gauge 42 need not be consistent or uniform throughout the entirety of un-stretched film 10. Thus, the starting gauge 42 can vary due to intentional product design, manufacturing defects, tolerances, or other processing inconsistencies.

FIGS. 1A and 1B illustrate the TD intermeshing rollers 12, 14 can process the flat film 10 into a TD incrementally-stretched film 10b. As previously mentioned, the TD incrementally-stretched film 10b can include a ribbed pattern 36. The ribbed pattern 36 can include alternating series of thicker sections or ribs 44 and thinner sections or ribs 46. The thicker ribs 44 can comprise "un-stretched" regions and the thinner ribs 46 can comprise stretched regions. In one or more implementations, the thicker ribs 44 regions of the incrementally-stretched films may be stretched to a small degree. In any event, the thicker ribs 44 are stretched less than the thinner ribs 46. The ribs 44, 46 can extend across the TD incrementally-stretched film 10b in the machine direction.

One will appreciate in light of the disclosure herein that the ribbed pattern 36 may vary depending on the method used to incrementally stretch the film 10. To the extent that TD ring rolling is used to incrementally stretch the film 10, the ribbed pattern 36 on the film 10 can depend on the pitch 32 of the ridges 24, 26, the DOE 34, and other factors. In some implementations, the molecular structure of the thermoplastic material of the film 10 may be rearranged to provide this shape memory.

Figure 2A:
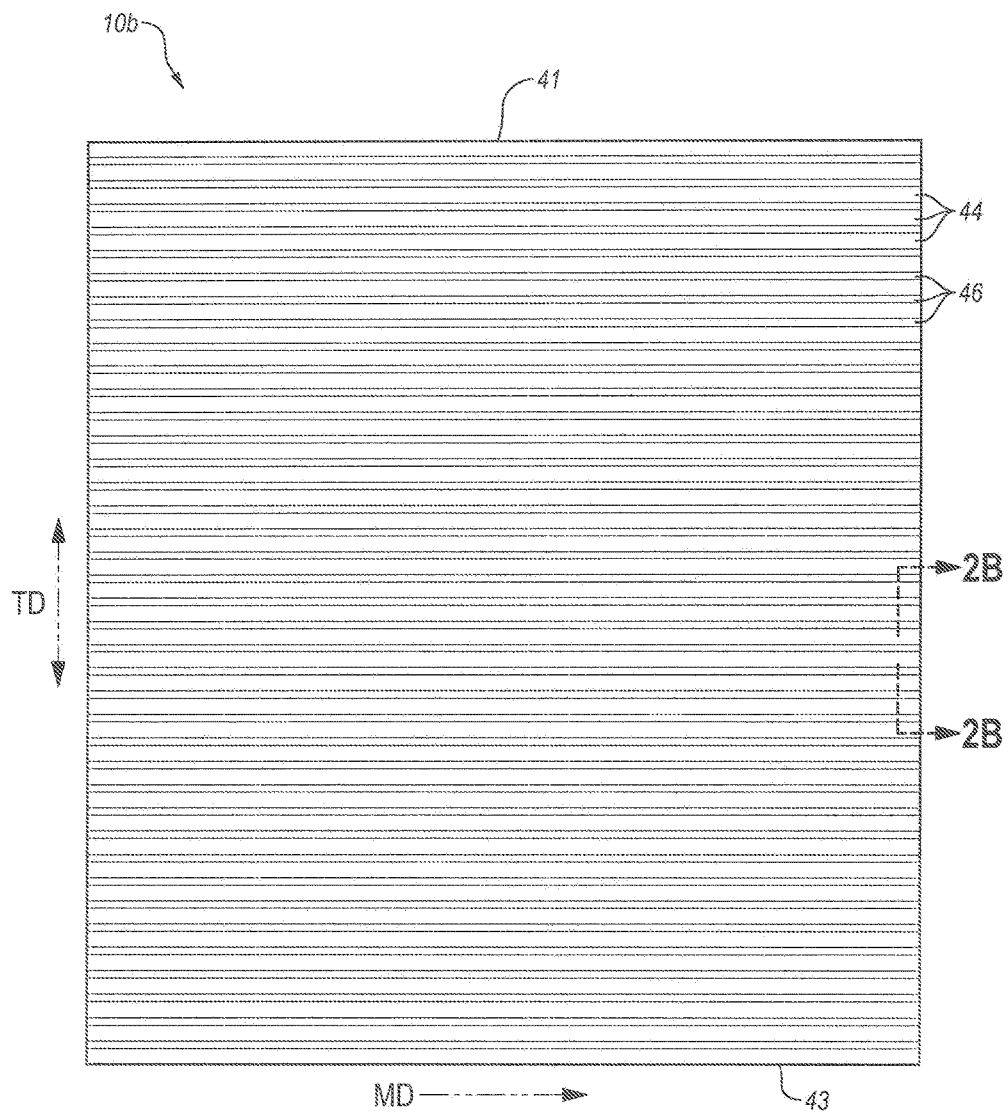
FIG. 2A illustrates a view of an incrementally-stretched thermoplastic film created by the TD intermeshing rollers of FIG. 1A.

FIG. 2A illustrates a top view of the TD incrementally-stretched film 10b. The ribs 44, 46 can extend across the film 10b in a direction parallel to a direction in which the film was extruded (i.e., machine direction). As shown by FIG. 2A, ribs 44, 46 can extend across the entire width of the film 10b. The pitch 32 and the DOE 34 of the ridges 24, 26 of the TD intermeshing rollers 12, 14 can determine the width and spacing of the ribs 44, 46. Thus, as explained in greater detail below, by varying the pitch 32 and/or DOE 34, the width and/or spacing of the ribs 44, 46, the amount of stretching the film undergoes, and the effects of the stretching on the physical properties can be varied.

In the illustrated implementation (FIG. 2A), the ribbed pattern 36 may show ribs parallel with each other and perpendicular to the top edge of the film. The ribbed pattern 36 may show equally spaced ribs that parallel the width of the film 10b between the first and second side edges across the entire width of the film 10b from side edge 41 to side edge 43. In other implementations, the ribbed pattern 36 may show ribs unequally spaced apart from each other. The ribbed pattern 36 may have a length commensurate with the length of the film 10b.

FIG. 2A further illustrates that the thinner ribs 46 can be intermittently dispersed about thicker ribs 44. In particular, each thinner rib 46 can reside between adjacent thicker ribs 44. The ribs 44, 46 or ribbed pattern 36 can provide a pleasing appearance and connote strength to a consumer. For example, the stripped pattern 36 can signify that the film 10b has undergone a physical transformation to modify one or more characteristics of the film 10b. For example, TD ring rolling the film 10 can increase or otherwise modify one or more of the tensile strength, tear resistance, impact resistance, or elasticity of the film 10b. The ribbed pattern 36 can signify the physical transformation to a consumer.

Figure 2B:
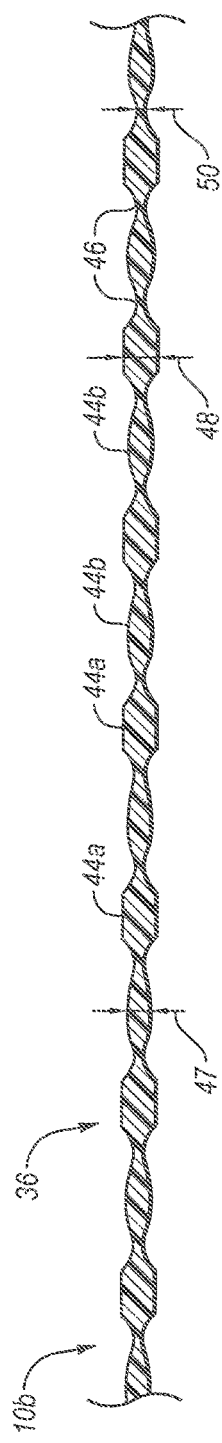
FIG. 2B illustrates schematic cross-sectional view of the thermoplastic film of FIG. 2A taken along the line 2B-2B of FIG. 2A.

Referring to FIG. 2B, a cross section of the ribbed pattern 36 is illustrated. The cross section may take the form of a plurality of alternating linear ribs 44a and 44b that may be parallel and adjacent to one another. The ribs 44a, 44b can have differing shapes and/or sizes. In particular, the ribs 44b that contact the ridges 24, 26 when passing through the TD intermeshing rollers 12, 14 can have a first shape or size. The ribs 44a that do not contact the ridges 24, 26 when passing through the TD intermeshing rollers can have a second shape or size differing from the first.

The thicker ribs 44a can have a first average thickness or gauge 48. The first average gauge 48 can be approximately equal to the starting gauge 42 (FIG. 1B). In one or more implementations, the first average gauge 48 can be less than the starting gauge 42. The thicker ribs 44a can have a second average gauge 47. The second average gauge 47 can be less than both the starting gauge 42 and the first average gauge 48. Still further, the thinner ribs 46 can have a third average thickness or gauge 50. The third average gauge 50 can be less than the starting gauge 42, the first average gauge 48, and the second average gauge 47. In one or more implementations the gauges 47 and or 48 can be about 0.15 mils to about 0.40 mils.

Figure 3:
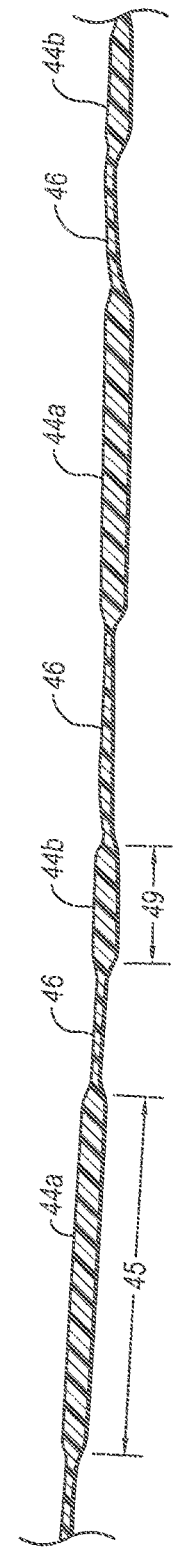
FIG. 3 is a drawing of a photomicrograph of a TD incrementally-stretched film taken along a line transverse to the ribs of the TD incrementally-stretched film in accordance with one or more implementations of the present invention.

FIG. 3 shows a drawing of a photomicrograph and 80× magnification showing alternating linear thicker ribs 44a, 44b separated by thinner ribs 46. Depending upon the processing conditions, the width 45 of the ribs 44a and the width 49 of the ribs 44b can vary. As shown in one or more implementations, the width 45 is generally greater than the width 49. For example, the width 45 may be more than twice the width 49, as shown in FIG. 3.

As alluded to earlier, TD incrementally stretching the flat film 10 can tailor one or more properties of the film. One will appreciate in light of the disclosure herein that various factors can affect the how the properties of a flat film are changed during a TD ring rolling process. For example, the tear resistance of the TD incrementally-stretched film can be based at least on part on the ratio of DOE to pitch. Furthermore, the ratio of DOE to pitch that will maintain or increase the ratio of MD tear resistance to TD tear resistance of a particular film can be based on one or more of the thermoplastic material of the film, the extrusion process (i.e., cast versus blown), the starting gauge of the film, and the BUR used to form the film when the film is a blown film. The following examples present the results of a series of tests performed on thermoplastic films that have been incrementally stretched in the machine direction. These examples are illustrative of the invention claimed herein and should not be construed to limit in any way the scope of the invention.

Example 1

In a first example, two films were TD incrementally stretched using a cold TD ring rolling process similar to that described herein above. Film one was a cast 100% LDPE film with a gauge of 0.42 mils. Film 2 was a blown 100% LDPE with a gauge of 0.46 mils. The intermeshing rolls used in comparative Example 1 had a 0.040" pitch. The TD DOE to pitch ratio used to stretch the films varied from between 0 and 0.75. The results from Example 1 are shown in Table I.

TABLE I

| | Physical Properties | | | | | |
|---|---|---|---|---|---|---|
| Run # | TD DOE/ Pitch | Width (inches) | MD Tear (grams) | TD Tear (grams) | MD to TD tear ratio | GBW relative to flat film (%) |
| Flat Cast Film | 0 | 11.75 | 102.08 | 65.16 | 1.56 | 1.00 |
| 1 | 0.50 | 13.5 | 69.44 | 36.24 | 1.92 | 86 |
| 2 | 0.75 | 17.0 | 64.48 | 25.76 | 2.50 | 67 |
| Flat Blown Film | 0 | 11.66 | 119.76 | 85.76 | 1.40 | 100 |
| 3 | 0.50 | 13 | 83.56 | 54.04 | 1.54 | 89 |
| 4 | 0.75 | 17 | 36.2 | 33.76 | 1.07 | 63 |

The results indicate that the TD incrementally-stretched film under certain conditions can increase the ratio of MD tear resistance to TD tear resistance. Specifically, in some instances the increase ratio of MD tear resistance to TD tear resistance can be as great as 1.6 times ratio of MD tear resistance to TD tear resistance of the flat film. In particular, run 2 increased the ratio of MD tear resistance to TD tear resistance 1.6 times while also decreasing the gauge by weight to by 33%.

Example 2

In a second example, blown film of LLDPE with a 0.9 mil gauge was used. The film was TD incrementally stretched using a cold TD ring rolling process similar to that described herein above. The intermeshing rolls used in comparative Example 2 had a 0.040" pitch. The TD DOE to pitch ratio used to stretch the film was 1.37. The resulting TD incrementally stretched film had a 0.54 mil gauge. The results from Example 2 are shown in Table II.

TABLE II

Physical Properties

| Run # | MD Tear (grams) | TD Tear (grams) | MD to TD tear ratio | GBW relative to flat film (%) |
|---|---|---|---|---|
| Flat Film | 320 | 820 | 0.40 | 1.00 |
| 1 | 163 | 65 | 2.51 | 60 |

As can be seen from Table II, the ring rolling process allows the extrusion of a higher gauge LLDPE film, while achieving a suitable MD to TD tear resistance ratio after down gauging by the ring roll process. A suitable/high MD to TD tear ratio can be important for proper consumer handling. For example, a high MD to TD tear ratio means that the film will easy tear across a cutter bar, while also not splitting when being pulled off of a roll. In particular, in Example 2, the ratio of MD tear resistance to TD tear resistance increased 6.25 times while also decreasing the gauge by weight by 40%. Note that for Example 2, after the ring roll process the TD tear resistance was less than 100 grams. In a suitable implementation of the invention, the ratio of MD tear resistance to TD tear resistance is greater than or equal to 1.0, or greater than or equal to 2.0, or greater than or equal to 2.5.

Example 3

In a third example, two mono-layer films were TD incrementally stretched using a cold MD ring rolling process similar to that described herein above. The first film was a hexene gas phase LLDPE film with a density of 0.926, a starting gauge of 0.9 mils, and a BUR of 2.9. The second film was a hexene gas phase LLDPE film with a density of 0.918, a starting gauge of 0.9 mils, and a BUR of 2.0. The intermeshing rolls used in comparative Example 3 had a 0.040" pitch. The TD DOE to pitch ratio used to stretch the films varied from between 0 and 1.0. The tear resistance of these films was measured according to the methods and procedures set forth in ASTM D882-02. The results from Table III show additional physical properties of the films of Example 3.

TABLE III

Physical Properties

| Run # | TD DOE/ Pitch | BUR | MD Tear (grams) | TD Tear (grams) | MD to TD tear ratio | Dynatup Energy to max. load (In-Lb$_f$) | GBW relative to flat film (%) |
|---|---|---|---|---|---|---|---|
| Flat Film | 0 | 2.9 | 380 | 704 | 0.54 | 6.60 | 1.00 |
| 1 | 0.50 | 2.9 | 352 | 431 | 0.81 | 6.93 | 92 |
| 2 | 1 | 2.9 | 231 | 85 | 2.72 | 8.05 | 64 |
| Flat Film | 0 | 2.0 | 125 | 696 | 0.18 | 4.37 | 100 |
| 3 | 0.50 | 2.0 | 235 | 333 | 0.71 | 3.56 | 86 |
| 4 | 1 | 2.0 | 191 | 72 | 2.65 | 2.98 | 73 |

The results indicate that the TD incrementally-stretched film under certain conditions can increase the ratio of MD tear resistance to TD tear resistance. For example, in run 2 a film generally considered unacceptable for use as food wrap both due to the MD to TD tear resistance ratio of 0.54 and a gauge of 0.9 mils was TD ring rolled to create a film with an MD to TD tear resistance ratio of 2.72.

The results indicate that the TD incrementally stretched film under certain conditions can have a maintained or increased ratio of MD tear resistance to TD tear resistance. Specifically, in some instances the increase in ratio of MD tear resistance to TD tear resistance can be as great as about 14 times the flat film. Furthermore, Table III indicates that the TD tear resistance of the TD incrementally stretched generally decreases with TD ring rolling. Table III additionally indicates that the energy to maximum load (Dynatup Max), which relates to impact resistance, may be maintained or increased under certain conditions. Table III further illustrates that the incrementally stretched films can include a maintained or increased MD tear resistance despite a reduction in gauge. One will appreciate in light of the disclosure herein that this is an unexpected result, as MD tear is expected to decrease as the gauge of the film decreases.

For example, in run 3 of example 6, a thermoplastic film was TD incrementally stretched using TD intermeshing rollers with a TD DOE to pitch ratio of 0.50. Run 3 yielded a TD incrementally stretched film with an increase in MD tear resistance of about 88%, a decrease in TD tear resistance of about 52%, and a reduction in gauge of about 14%. The reduction in MD tear resistance may be considered acceptable, particularly when combined with a gauge reduction of 14%.

Figure 4:
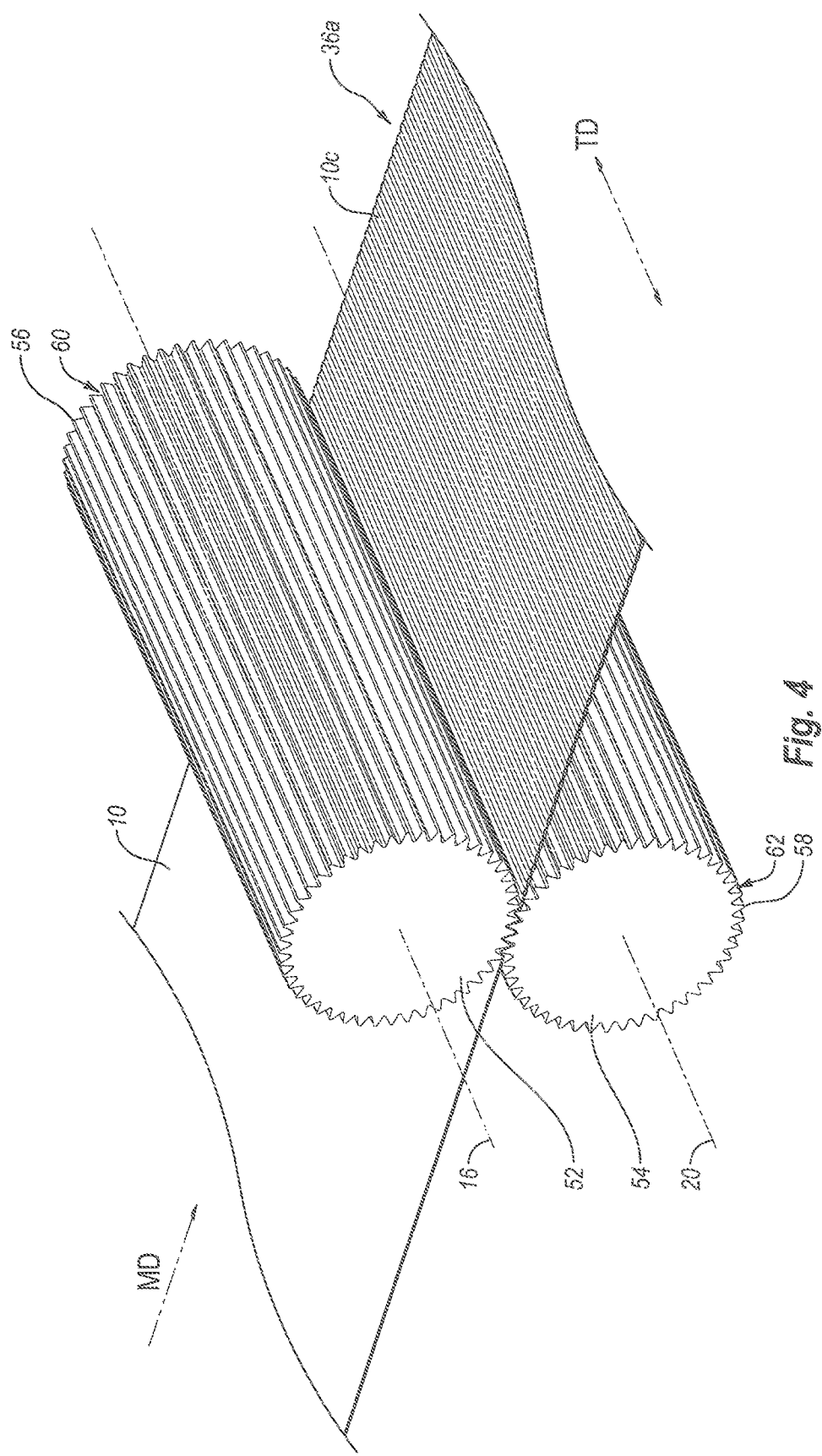
FIG. 4 illustrates a schematic diagram of a thermoplastic film being incrementally stretched by MD intermeshing rollers in accordance with one or more implementations of the present invention.

In addition to TD ring rolling, implementations of the present invention further include additionally, or alternatively, using MD ring rolling to incrementally stretch a thermoplastic film to enhance, or otherwise modify, physical properties of the film. For example, FIG. 4 illustrates an MD ring rolling process that incrementally stretches a thermoplastic film 10 by passing the film 10 through a pair of MD intermeshing rollers 52, 54. A MD ring rolling processes (and associated MD intermeshing rollers 52, 54) can be similar to the TD ring rolling process (and associated TD intermeshing rollers 12, 14) described herein above, albeit that the ridges 56, 58 and grooves 60, 62 of the MD intermeshing rollers 52, 54 can extend generally parallel to the axes of rotation 16, 20.

Thus, as shown by FIG. 4, as the thermoplastic film 10 passes between the intermeshing rollers 52, 54, the ridges 56, 58 can incrementally stretch the film 10 in the machine direction. In particular, as the film 10 proceeds between the intermeshing rollers 52, 54, the ridges 56, 58 can impart or form a ribbed pattern 36a into the film 10 to form an MD incrementally-stretched film 10c.

Similar to a TD ring rolling process, the pitch and depth of engagement of the ridges 56, 58 can determine, at least in part, the amount of incremental stretching created by the MD intermeshing rollers 52, 54. The ratio of MD DOE to pitch can determine, at least in part, the amount of stretch imparted by a pair of MD intermeshing rollers 52, 54, and the effect upon the gauge and other physical properties of the film. 10.

As shown by FIG. 4, the direction of travel of the film 10 through the MD intermeshing rollers 52, 54 is parallel to the machine direction and perpendicular to the transverse direction. As the thermoplastic film 10 passes between the MD intermeshing rollers 52, 54, the ridges 56, 58 can incrementally stretch the film 10 in the machine direction. In one or more implementations, stretching the film 10 in the machine direction can reduce the gauge of the film and increase the length of the film 10. In other implementations, the film 10 may rebound after stretching such that the gauge of the film 10 is not decreased. Furthermore, in some implementations, stretching the film 10 in the machine direction can reduce the width of the film 10. For example, as the length of the film 10 is increased, the film's width can be reduced.

In particular, as the film 10 proceeds between the MD intermeshing rollers 52, 54, the ridges 56 of the first roller 52 can push the film 10 into the grooves 62 of the second roller 54 and vice versa. The pulling of the film 10 by the ridges 56, 58 can stretch the film 10. The MD intermeshing rollers 52, 54 may not stretch the film 10 evenly along its length. Specifically, the rollers 56, 58 can stretch the portions of the film 10 between the ridges 56, 58 more than the portions of the film 10 that contact the ridges 56, 58. Thus, the MD intermeshing rollers 52, 54 can impart or form a ribbed pattern 36a into the film 10.

Figure 5:
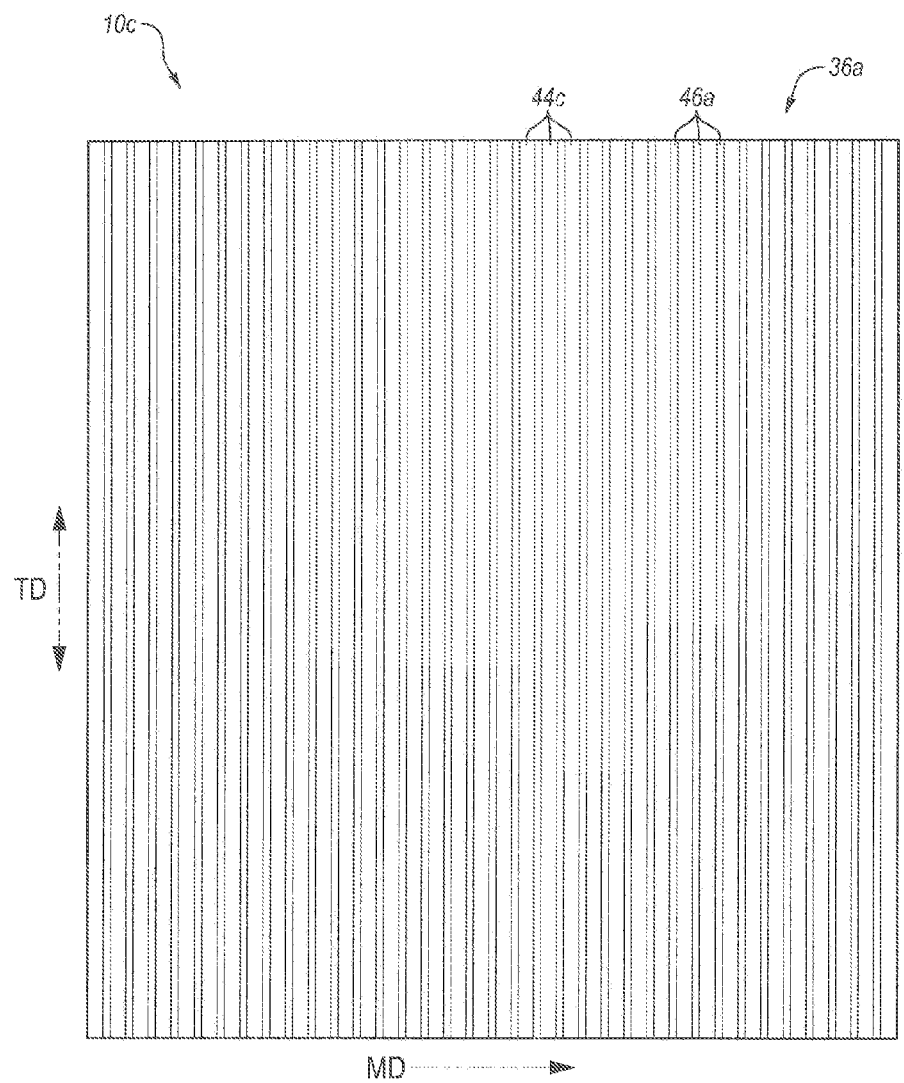
FIG. 5 illustrates a view of an incrementally-stretched thermoplastic film created by the MD intermeshing rollers of FIG. 4.

FIG. 5 illustrates a top view of the MD incrementally-stretched film 10c. As shown, the MD incrementally-stretched film 10c can include ribs 44c, 46a that extend across the film 10c in the direction transverse to the direction in which the film was extruded (i.e., machine direction). As shown by FIG. 5, ribs 44c, 46a can extend across the entire width of the film 10c. The pitch and the DOE of the ridges 56, 58 of the MD intermeshing rollers 52, 54 can determine the width and spacing of the ribs 44c, 46a. Thus, as explained in greater detail below, by varying the pitch and/or DOE, the width and/or spacing of the ribs 44c, 46a, the amount of stretching the film undergoes, and the effects of the stretching on the physical properties can be varied.

The ribbed pattern 36a can include alternating series of thicker sections or ribs 44c and thinner sections or ribs 46a. The thicker ribs 44c can comprise "un-stretched" regions and the thinner ribs 46a can comprise stretched regions. In one or more implementations, the thicker ribs 44c regions of the incrementally-stretched films may be stretched to a small degree. In any event, the thicker ribs 44c are stretched less compared to the thinner ribs 46a.

The thicker ribs 44c can have a first average thickness or gauge. The first average gauge can be approximately equal to a starting gauge of the film 10. In one or more implementations, the first average gauge can be less than the starting gauge. The thinner ribs 46a can have a second average thickness or gauge. The second average gauge can be less than both the starting gauge and the first average gauge.

One will appreciate in light of the disclosure herein that the ribbed pattern 36a may vary depending on the method used to incrementally stretch the film 10. To the extent that MD ring rolling is used to incrementally stretch the film 10, the ribbed pattern 36a on the film 10 can depend on the pitch of the ridges 56, 58, the DOE, and other factors. In some implementations, the molecular structure of the thermoplastic material of the film 10 may be rearranged to provide this shape memory.

FIG. 5 further illustrates that the thinner ribs 46a can be intermittently dispersed about thicker ribs 44c. In particular, each thinner rib 46a can reside between adjacent thicker ribs 44c. The ribs 44c, 46a or ribbed pattern 36a can provide a pleasing appearance and connote strength to a consumer. For example, the ribbed pattern 36a can signify that the film 10c has undergone a transformation to modify one or more characteristics of the film 10c. For example, TD ring rolling the film 10 can increase or otherwise modify one or more of the tensile strength, tear resistance, impact resistance, or elasticity of the film 10c. The ribbed pattern 36a can signify the transformation to a consumer.

Example 4

In a fourth example, two films were MD incrementally stretched using a cold MD ring rolling process similar to that described herein above. Film one was a cast 100% LDPE film with a gauge of 0.42 mils. Film 2 was a blown 100% LDPE with a gauge of 0.46 mils. The intermeshing rolls used in comparative Example 2 had a 0.200" pitch. The MD DOE to pitch ratio used to stretch the films varied from between 0 and 0.9. The results from Example 4 are shown in Table IV.

TABLE IV

| | Physical Properties | | | | | |
|---|---|---|---|---|---|---|
| Run # | MD DOE/ Pitch | Width (inches) | MD Tear (grams) | TD Tear (grams) | MD to TD tear ratio | GBW relative to flat film (%) |
| Flat Cast Film | 0 | 11.75 | 102.08 | 65.16 | 1.56 | 1.00 |
| 1 | 0.70 | 10.88 | 116.72 | 51.60 | 2.26 | 88 |
| 2 | 0.90 | 10 | 111.56 | 37.0 | 3.02 | 74 |
| Flat Blown Film | 0 | 11.66 | 119.76 | 85.76 | 1.40 | 100 |
| 3 | 0.70 | 11.25 | 148.96 | 69.65 | 2.13 | 91 |
| 4 | 0.90 | 10.75 | 136.48 | 80.49 | 1.70 | 80 |

The results indicate that the MD incrementally-stretched film can increase the ratio of MD tear resistance to TD tear resistance. Specifically, in some instances the MD incrementally-stretched film can have a higher MD tear resistance and a reduced TD tear resistance, while providing a reduction in gauge.

Example 5

In a fifth example, a two-layered thermoplastic film was MD incrementally stretched using a cold MD ring rolling process similar to that described herein above. The intermeshing rolls used in comparative Example 5 had a 5.933" diameter, 0.100" pitch, 30 diametral pitch, and a 14½° pressure angle. The films were hexene gas phase LLDPE films having a starting gauge of 1.1 mils and a BUR of 2.0. The films were run through the MD ring rolling process at a line speed of 300 feet per minute. The MD DOE to pitch ratio used to stretch the films varied from between 0 and 1.0. The thermoplastic film was MD incrementally stretched with four different DOEs. Specifically, the film was MD incrementally stretched at MD DOEs of 0.25, 0.50, 0.75, and 1.

TABLE V

| | Physical Properties | | | | |
|---|---|---|---|---|---|
| MD DOE/ Pitch | MD Tear (grams) | TD Tear (grams) | MD to TD tear ratio | Dynatup Energy to max. load (In-Lb$_f$) | (GBW) relative to flat film |
| 0 | 312 | 932 | 0.33 | 5.63 | 1.0 |
| 0.25 | 308 | 867 | 0.36 | 7.01 | 1.132 |
| 0.50 | 380 | 905 | 0.34 | 6.60 | 1.081 |
| 0.75 | 380 | 973 | 0.39 | 4.05 | 1.038 |
| 1 | 502 | 972 | 0.52 | 4.58 | 0.962 |

Table V lists the physical properties of these films along with the physical properties of the flat film. The results from Table V indicate that the bi-layer MD incrementally stretched film under certain conditions can have a maintained or increased MD tear resistance. Specifically, in some instances the MD tear resistance can be as great as 1.6 times the flat film. Furthermore, Table V indicates that the TD tear resistance of the MD incrementally stretched can increase under certain conditions. Furthermore, Table V indicates that the energy to maximum load (Dynatup Max), which relates to impact resistance, may not be significantly decreased under certain conditions.

Table V further illustrates that the incrementally stretched films can include a maintained or increased MD tear resistance despite a reduction in gauge. One will appreciate in light of the disclosure herein that this is an unexpected result, as MD tear resistance is expected to decrease as the gauge of the film decreases. For example, Table V illustrates that the un-stretched film (0 MD DOE) can have an MD tear resistance to GBW ratio of 291.86. While films processed according to one or more implementations of the present invention can include an MD tear resistance to GBW ratio as large as 1.8 times the un-stretched film. One or more implementations of the present inventions include incrementally stretched films with MD tear resistance to GBW ratios between about 1 and about 2 times greater than the flat film. More particularly, one or more implementations of the present inventions include incrementally stretched films with MD tear resistance to GBW ratios between about 1.2 and about 1.8 times greater than the un-stretched film.

The results indicate that uncertain conditions the MD incrementally-stretched film can have only nominal increases in the ratio of MD tear resistance to TD tear resistance.

Example 6

In a sixth example, two mono-layer films were MD incrementally stretched using a cold MD ring rolling process similar to that described herein above. The first film was a hexene gas phase LLDPE film with a density of 0.926, a starting gauge of 0.9 mils, and a BUR of 2.9. The second film was a hexene gas phase LLDPE film with a density of 0.918, a starting gauge of 0.9 mils, and a BUR of 2.0. The intermeshing rolls used in comparative Example 6 had a 5.933" diameter, 0.100" pitch, 30 diametral pitch, and a 14½° pressure angle. The MD DOE to pitch ratio used to stretch the films varied from between 0 and 1.0. The MD tear resistance of these films was measured according to the methods and procedures set forth in ASTM D882-02. The results from Table VI show physical properties of the films of Example 6.

TABLE VI

Physical Properties

| Run # | MD DOE/ Pitch | BUR | MD Tear (grams) | TD Tear (grams) | MD to TD tear ratio | Dynatup Energy to max. load (In-Lbf) | GBW relative to flat film (%) |
|---|---|---|---|---|---|---|---|
| Flat Film | 0 | 2.9 | 380 | 704 | 0.54 | 6.60 | 1.00 |
| 1 | 0.50 | 2.9 | 457 | 642 | 0.71 | 5.02 | 1.00 |
| 2 | 1 | 2.9 | 370 | 706 | 0.43 | 4.75 | 93 |
| Flat Film | 0 | 2.0 | 125 | 696 | 0.18 | 4.37 | 100 |
| 3 | 0.50 | 2.0 | 173 | 614 | 0.28 | 4.44 | 100 |
| 4 | 1 | 2.0 | 273 | 846 | 0.32 | 3.49 | 78 |

The results indicate that incremental stretching in under some conditions can cause the ratio of machine-direction tear resistance to transverse-direction tear resistance to go down.

Figure 6:
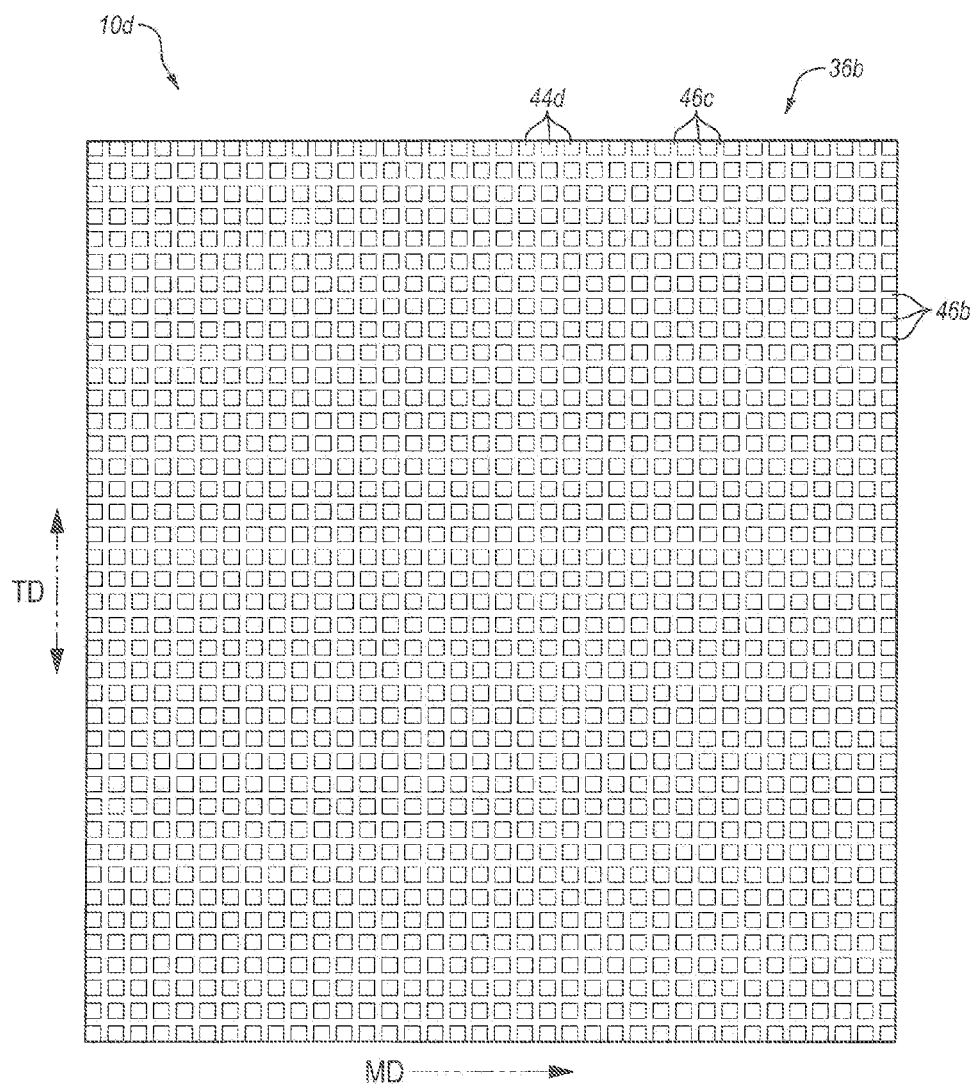
FIG. 6 illustrates a view of an incrementally stretched film created by the intermeshing rollers of both FIG. 1A and FIG. 4.
Figure 9:
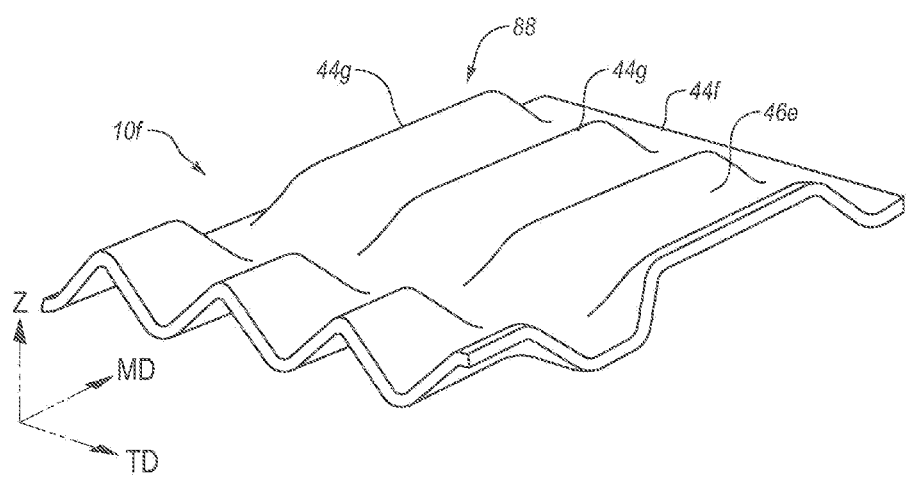
FIG. 9 illustrates a view of portion of an incrementally-stretched thermoplastic film created by the intermeshing rollers of FIG. 8.

In still further implementations, a film 10 can undergo both a TD ring rolling process and an MD ring rolling process to further enhance, or otherwise modify, the physical properties of the film. For example, FIG. 6 illustrates a top view of an incrementally-stretched film 10d created by MD and TD ring rolling. The incrementally-stretched film 10d can have a ribbed or checker board pattern 36b. The ribbed pattern 36b can include alternating series of thicker ribs or regions 44d and thinner ribs 46b, 46c. The thinner ribs 46b, 46c can include ribs 46b that extend along the film 10c in the machine direction created by TD ring rolling, and ribs 46c that extend along the film in the transverse direction created by MD ring rolling. As shown by FIG. 9, in one or more implementations, the aspect ratio of the rows and columns of the stretched thinner ribs 46b, 46c can be approximately 1 to 1. In alternative implementations, the aspect ratio of the rows and columns of the rows and columns of the stretched thinner ribs 46b, 46c can be greater or less than 1 to 1.

The incrementally-stretched film 10d created by MD and TD ring rolling can allow for even greater material savings by further increasing the surface area of a given portion of film. Additionally, MD and TD ring rolling can provide properties or advantages not obtained by MD or TD ring rolling alone. Thus, checker board pattern 36b created by the thinner ribs 46b, 46c can signify these transformations to a consumer.

As alluded to earlier, the tear resistance ratios or other properties of the incrementally-stretched film 10d can be based at least on part on the ratios of TD and MD DOE to pitch. Furthermore, the ratios of TD and MD DOE to pitch that will maintain or increase the tear resistance ratio or other properties of a particular film can be based on one or more of the thermoplastic material of the film, the starting gauge of the film, and the BUR (when blown) used to form the film. The following examples present the results of a series of tests performed on thermoplastic films that have been incrementally stretched in the machine direction and transverse directions. These examples are illustrative of the invention claimed herein and should not be construed to limit in any way the scope of the invention.

Example 7

In a seventh example, two films were TD and MD incrementally stretched using a cold ring rolling processes similar to those described herein above. Film one was a cast 100% LDPE film with a gauge of 0.42 mils. Film 2 was a blown 100% LDPE with a gauge of 0.46 mils. The TD intermeshing rolls used in comparative Example 7 had a 0.040" pitch. The MD intermeshing rolls used in comparative Example 7 had a 0.200" pitch. The results from Example 7 are shown in Table VII.

TABLE VII

Physical Properties

| Run # | MD DOE/ Pitch | TD DOE/ Pitch | MD Tear (grams) | TD Tear (grams) | MD to TD tear ratio | GBW relative to Flat film (%) |
|---|---|---|---|---|---|---|
| Flat Cast Film | 0 | 0 | 102.08 | 65.16 | 1.56 | 1.00 |
| 1 | 0.70 | 0.25 | 113 | 44.48 | 2.54 | 88 |
| 2 | 0.70 | 0.50 | 83.60 | 28.64 | 2.92 | 71 |
| Flat Blown Film | 0 | 0 | 119.76 | 85.76 | 1.40 | 100 |
| 3 | 0.70 | 025 | 138.88 | 64.76 | 2.14 | 89 |

The results indicate that the TD and MD incrementally-stretched film under certain conditions can increase the ratio of MD tear resistance to TD tear resistance. Specifically, in some instances the increase in the ratio of MD tear resistance to TD tear resistance can be as great as 1.6 times ratio of MD tear resistance to TD tear resistance of the flat film. In particular, run 2 increased the ratio of MD tear resistance to TD tear resistance 1.87 times while also decreasing the gauge by weight by 29%.

Example 8

In an eighth example, the two mono-layer films used in Examples 3 and 6 were MD and TD incrementally stretched using a cold ring rolling processes similar to that described herein above. The MD intermeshing rolls used in comparative Example 8 had a 5.933" diameter, 0.100" pitch, 30 diametral pitch, and a 14½° pressure angle. The MD DOE to pitch ratio used to stretch the films varied from between 0 and 1.0. The TD intermeshing rolls used in Example 8 had a 0.040" pitch. The TD DOE to pitch ratio used to stretch the films varied from between 0 and 1.0. The MD tear resistance of these films was measured according to the methods and procedures set forth in ASTM D882-02.

The first film was first MD ring rolled. The first film was then TD ring rolled, and the effect of the TD ring rolling on the MD incrementally stretched film was observed. The results from Table VIII show additional physical properties of the films of Example 8.

TABLE VIII

Physical Properties

| Run # | BUR | MD DOE/ Pitch | TD DOE/ Pitch | MD Tear (g) | TD Tear (g) | MD to TD tear ratio | Dynatup Energy to max. load (In-Lb$_f$) | GBW relative to flat film (%) |
|---|---|---|---|---|---|---|---|---|
| Flat Film | 2.9 | 0 | 0 | 380 | 704 | 0.54 | 6.60 | 100 |
| 1 | 2.9 | 0.50 | 0.50 | 377 | 462 | 0.82 | 6.87 | 91 |
| 2 | 2.9 | 1.00 | 0.50 | 371 | 453 | 0.82 | 4.21 | 82 |
| 3 | 2.9 | 0.50 | 1.00 | 219 | 82 | 2.67 | 6.13 | 61 |
| 4 | 2.9 | 1.00 | 1.00 | 146 | 101 | 1.45 | 4.02 | 53 |
| Flat Film | 2.0 | 0 | 2.0 | 125 | 696 | 0.18 | 4.37 | 100 |
| 5 | 2.0 | 0.50 | 0.50 | 268 | 418 | 0.64 | 3.33 | 86 |
| 6 | 2.0 | 1.00 | 0.50 | 273 | 570 | 0.48 | 2.28 | 71 |
| 7 | 2.0 | 0.50 | 1.00 | 138 | 60 | 2.30 | 2.81 | 56 |
| 8 | 2.0 | 1.00 | 1.00 | 71 | 76 | 0.93 | 0.82 | 44 |

The results indicate that the TD and MD incrementally-stretched film under certain conditions can increase the ratio of MD tear resistance to TD tear resistance. Specifically, in some instances the increase in the ratio of MD tear resistance to TD tear resistance can be as great as 4.9 times ratio of MD tear resistance to TD tear resistance of the flat film. In particular, run 3 increased the ratio of MD tear resistance to TD tear resistance 4.9 times while also decreasing the gauge by weight to by 39%. Thus, in run 3 a film generally considered unacceptable for use as food wrap both due to the MD to TD tear resistance ratio of 0.54 and a gauge of 0.9 mils was TD and MD ring rolled to create a film with an MD to TD tear resistance ratio of 2.67 and a gauge equivalent to about a 0.55 mil flat film.

One will appreciate in light of the disclosure herein that implementations of the present invention can thus allow for the use of films generally not commonly used for food wraps by providing the ability to tailor the physical properties as desired. The ability to use films blown with a larger gauge can increase both manufacturing efficiency and output. Additionally, the ability to use LLDPE and mixtures of LLDPE and LDPE and reduce material costs.

Figure 7:
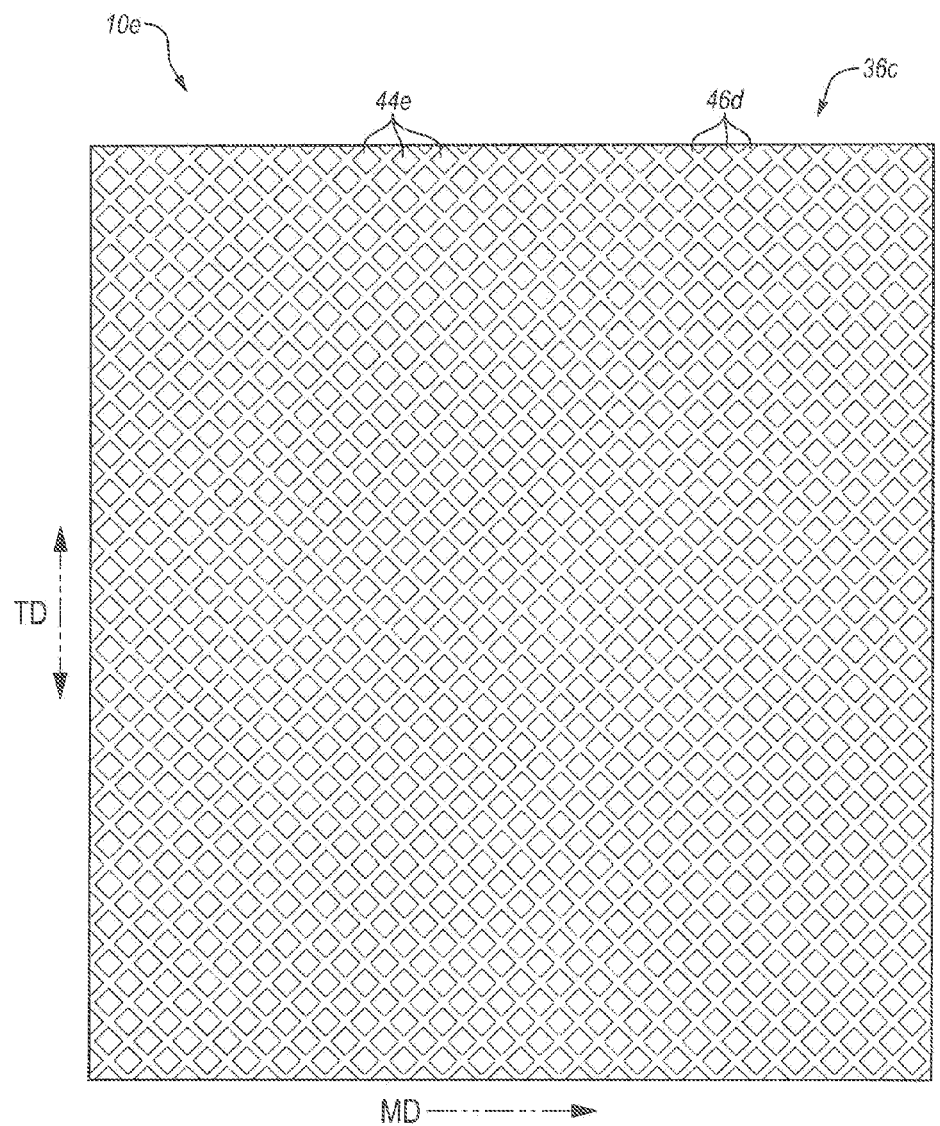
FIG. 7 illustrates a view of an incrementally-stretched thermoplastic film created by diagonal direction intermeshing rollers in accordance with one or more implementations of the present invention.

In addition TD and MD ring rolling, a manufacturer can use diagonal direction (DD) ring rolling to incrementally stretch a thermoplastic film to tailor the properties thereof. A DD ring rolling processes (and associated DD intermeshing rollers) can be similar to the TD ring rolling process (and associated TD intermeshing rollers 12, 14) described herein above, albeit that the ridges and grooves of the DD intermeshing rollers can extend at an angle relative to the axes of rotation. For example, FIG. 7 illustrates a view of an incrementally-stretched film 10e created by DD ring rolling. The incrementally-stretched film 10e can have a diamond pattern 36c. The diamond pattern 36c can include alternating series of diamond-shaped un-stretched regions 44e and stretched regions 46d. As shown by FIG. 7, stretched regions 46d can include stripes oriented at an angle relative to the transverse direction such that the stripes 46d are neither parallel to the transverse or machine direction.

One will appreciate in light of the disclosure herein that one or more implementations can include stretched regions arranged in other patterns/shapes. Such additional patterns include, but are not limited to, intermeshing circles, squares, diamonds, hexagons, or other polygons and shapes. Additionally, one or more implementations can include stretched regions arranged in patterns that are combinations of the illustrated and described patterns/shapes.

In any event the DD ring rolling can tailor or otherwise improve one or more properties of a thermoplastic film to configure the film for an intended use. In particular, DD ring rolling can provide the film 10e with a texture that can reduce the tendency for the film to block, while at the same time increasing the cling or ability of the film 10e to stick to a container or food. Similar to TD and MD ring rolling, DD ring rolling can also maintain or increase the MD tear resistance while maintaining or decreasing the TD tear resistance. Thus, DD ring rolling can tailor the film 10e for use a food wrap.

In accordance with another implementation, a structural elastic like film (SELF) process may be used to create a thermoplastic film with strainable networks. U.S. Pat. No. 5,518,801, U.S. Pat. No. 6,139,185; U.S. Pat. No. 6,150,647; U.S. Pat. No. 6,394,651; U.S. Pat. No. 6,394,652; U.S. Pat. No. 6,513,975; U.S. Pat. No. 6,695,476; U.S. Patent Application Publication No. 2004/0134923; and U.S. Patent Application Publication No. 2006/0093766 each disclose processes to form strainable networks or patterns of strainable networks suitable for use with implementations of the present invention. The contents of each of the aforementioned patents and patent application publications are incorporated in their entirety by reference herein.

Figure 8:
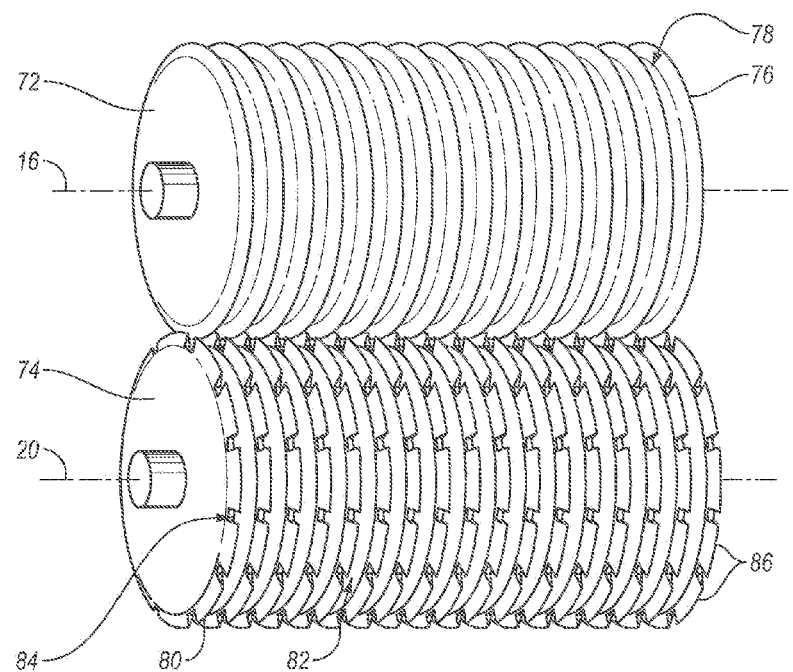
FIG. 8. illustrates a schematic diagram of a set of intermeshing rollers used to impart strainable networks into a film in accordance with one or more implementations of the present invention.

FIG. 8 illustrates a pair of SELF'ing intermeshing rollers 72, 74 for creating strainable networks in a film. The first SELF'ing intermeshing roller 72 can include a plurality of ridges 76 and grooves 78 extending generally radially outward in a direction orthogonal to an axis of rotation 16. Thus, the first SELF'ing intermeshing roller 72 can be similar to a TD intermeshing rollers 12, 14. The second SELF'ing intermeshing roller 74 can include also include a plurality of ridges 80 and grooves 82 extending generally radially outward in a direction orthogonal to an axis of rotation 20. As shown by FIG. 8, however, the ridges 80 of the second SELF'ing intermeshing roller 74 can include a plurality of notches 84 that define a plurality of spaced teeth 86.

Referring now to FIG. 9, an incrementally-stretched film 10f created using the SELF'ing intermeshing rollers 72, 74 is shown. In particular, as the film passes through the SELF'ing intermeshing rollers 72, 74, the teeth 86 can press a portion of the web out of plane to cause permanent, deformation of a portion of the film in the Z-direction. On the other hand the portions of the film that pass between the notched regions 84 and the teeth 86 will be substantially unformed in the Z-direction, resulting in a plurality of deformed, raised, rib-like elements 88.

As shown by FIG. 9, the strainable network of the incrementally-stretched film 10*f* can include first un-stretched regions 44*f*, second un-stretched regions 44*g*, and stretched transitional regions 46*e* connecting the first and second un-stretched regions 44*f*, 44*g*. The second un-stretched regions 44*g* and the stretched regions 46*e* can form the raised rib-like elements 88 of the strainable network. The stretched regions 46*e* can be discontinuous or be separated as they extend across the incrementally-stretched film 10*f* in both transverse and machine directions. This is in contrast to stripes that extend continuously across a film in one of the machine and transverse directions.

The rib-like elements 88 can allow the incrementally-stretched film 10*f* to undergo a substantially "geometric deformation" prior to a "molecular-level deformation." As used herein, the term "molecular-level deformation" refers to deformation, which occurs on a molecular level and is not discernible to the normal naked eye. That is, even though one may be able to discern the effect of molecular-level deformation, e.g., elongation of the film, one is not able to discern the deformation, which allows or causes it to happen. This is in contrast to the term "geometric deformation." As used herein, the term "geometric deformation" refers to deformations of the incrementally-stretched film 10*f*, which are generally discernible to the normal naked eye when the multi-layered film 10*f* or articles embodying the multi-layered film 10*f* are subjected to an applied strain. Types of geometric deformation include, but are not limited to bending, unfolding, and rotating.

Thus, upon an applied strain, the rib-like elements 88 can undergo geometric deformation before either the rib-like elements 88 or the flat regions undergo molecular-level deformation. For example, an applied strain can pull the rib-like elements 88 back into plane with the flat regions prior to any molecular-level deformation of the incrementally-stretched film 10*f*. Geometric deformation can result in significantly less resistive forces to an applied strain than that exhibited by molecular-level deformation.

Thus, the strainable network of the multi-layered film 10*f* may provide improved properties to the incrementally-stretched film 10*f*, such as elasticity, improved tear, and improved impact properties. The stretched regions 46*e* can provide notice to a consumer that the incrementally-stretched film 10*f* includes the improved properties provided by the strainable network. In any event the use of SELFing can tailor or otherwise improve one or more properties of a thermoplastic film to configure the film for an intended use. In particular, SELFing can provide the film 10*f* with a texture that can reduce the tendency for the film to block, while at the same time increasing the cling or ability of the film 10*f* to stick to a container or food. Similar to TD and MD ring rolling, SELFing can also maintain or increase the MD tear resistance while maintaining or decreasing the TD tear resistance. Thus, SELFing rolling can tailor the film 10*f* for use a food wrap.

One will appreciate in light of the disclosure herein that the pattern of the strainable network of FIG. 9 is only one pattern suitable for use with the present invention. In alternative implementations, an incrementally-stretched film can include a strainable network of rib-like elements arranged in diamond or other various patterns. It should be understood that the term "pattern" is intended to include continuous or discontinuous sections of patterns, such as may result, for example, from the intersection of first and second patterns with each other. Furthermore, the patterns can be aligned in columns and rows aligned in the machine direction, the transverse direction, or a direction offset from the machine and/or the transverse direction.

As shown by the various examples hereinabove, cold ring rolling can produce a reduction in film gauge, along with one or more of maintained or increased MD tear resistance, decreased tear resistance, decreased tendency to block, increased cling, increased ease of tearing the film with a cutter bar, increased surface roughness, and a visible pattern that communicates one or more of the foregoing tailored properties to a consumer.

Figure 10:
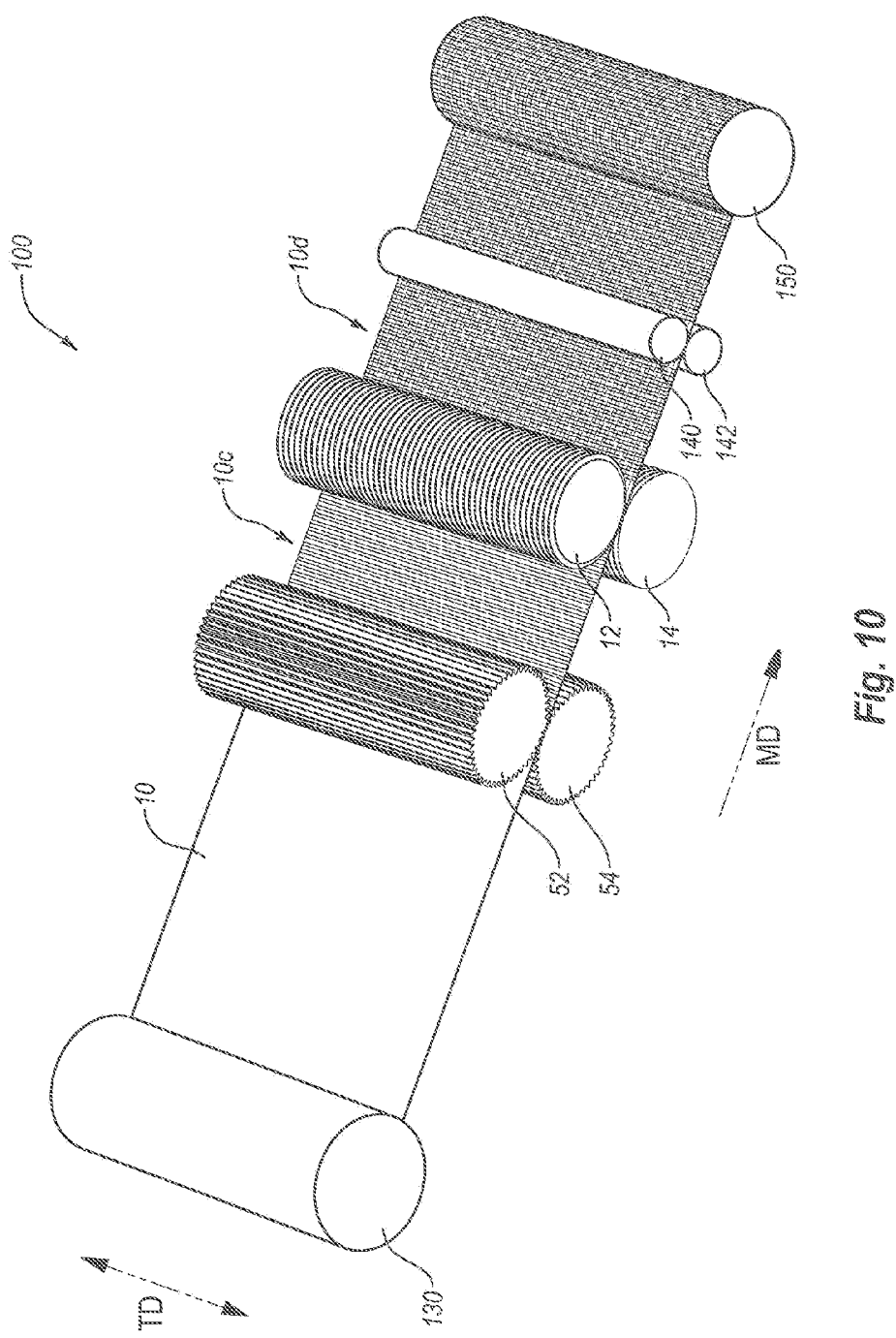
FIG. 10 illustrates a schematic diagram of a film manufacturing process in accordance with one or more implementations of the present invention.

FIG. 10 illustrates an exemplary embodiment of a high-speed manufacturing process 100 for incrementally stretching a thermoplastic film in one or more of the machine direction, the transverse direction, or another direction. According to the exemplary process, a flat thermoplastic film 10 is unwound from a roll 130 and directed along a machine direction. The flat film 10 can pass between one or more pairs of cylindrical intermeshing rollers to incrementally stretch the un-stretched film 10 and impart a ribbed pattern thereon. For example, FIG. 10 illustrates that the flat film 10 can pass through a first pair of MD intermeshing rollers 52, 54 and a second pair of TD intermeshing rollers 12, 14. In alternative implementations, the flat film 10 can pass through: only MD intermeshing rollers 52, 54; only TD intermeshing rollers 12, 14; through TD intermeshing rollers 12, 14 and then MD intermeshing rollers 52, 54, through DD intermeshing rollers, through SELFing rollers, or any combination of the foregoing.

The rollers 12, 14, 52, 54 may be arranged so that their longitudinal axes are perpendicular to the machine direction. Additionally, the rollers 12, 14, 52, 54 may rotate about their longitudinal axes in opposite rotational directions. In various embodiments, motors may be provided that power rotation of the rollers 12, 14, 52, 54 in a controlled manner. As the flat film passes between the rollers 52, 54, the ridges of the intermeshing rollers can impart a ribbed pattern and incrementally stretch the film, thereby creating an MD incrementally-stretched film 10*c*. Then as MD incrementally-stretched film 10*c* passes between the rollers 12, 14, the ridges of the intermeshing rollers can impart a ribbed pattern and incrementally stretch the film, thereby creating an MD and TD incrementally-stretched film 10*d*.

During the manufacturing process 100, the MD and TD incrementally-stretched film 10*d* can also pass through a pair of pinch rollers 140, 142. The pinch rollers 140, 142 can be appropriately arranged to grasp the MD and TD incrementally-stretched film 10*d*. The pinch rollers 140, 142 may facilitate and accommodate the MD and TD incrementally-stretched film 10*d*. Eventually, the MD and TD incrementally-stretched film 10*d* can be rolled onto a roll 150.

Figure 11:
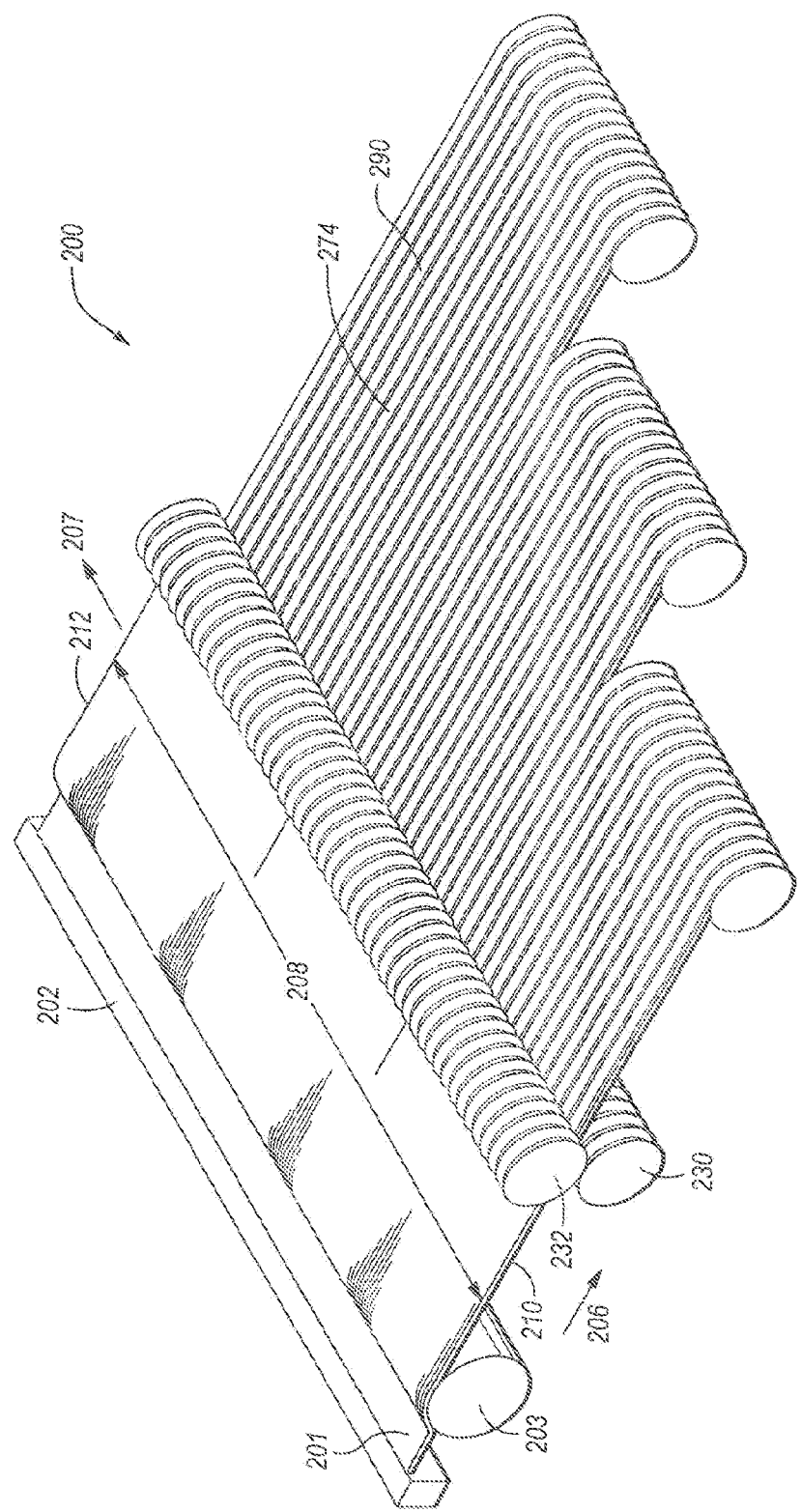
FIG. 11 illustrates a schematic diagram of another film manufacturing process in accordance with one or more implementations of the present invention.

One will appreciate in light of the disclosure herein that the process 100 described in relation to FIG. 10 can be modified to omit or expanded acts, or vary the order of the various acts as desired. For example, FIG. 11 illustrates another manufacturing process 200 for incrementally stretching a thermoplastic film to tailor the properties of the film. The high speed manufacturing process 200 may process continuous thermoplastic webs into the finished ribbed cling wrap.

In particular, a process device 202, for example a blown film or cast film extruder, may initially provide the web 201. The web 201 can travel from the extruder 202 onto a master roll 203. The master roll 203 is unwound and directed along a machine direction 206 by the processing equipment. The web 201 may have an initial width 208 between a first edge 210 and a second edge 212 of the web. The web 201 can be slit and fed into between cylindrical rollers 230, 232.

FIG. 11 illustrate that the rollers 203, 232 comprise TD intermeshing rollers. In alternative implementations, the process can use MD intermeshing rollers 52, 54, TD intermeshing rollers 12, 14, DD intermeshing rollers, SELFing rollers, or any combination of the foregoing. In any event, the rollers 230, 232 may have ridges on the rollers that may impart the ribs into the web. After the web 201 has passed between the first and second rollers 230, 232, the web includes a continuous ribbed pattern 274. Because the web 201 is TD stretched by the process of passing through the rollers 230, 232, the web can increases in width, while length and the gauge of the web are reduced. The web of ribbed film 290 may be wound up into a roll for packaging and distribution. For example, the roll 292 may be cut and placed into a carton (FIGS. 12A and 12B) or bag for sale to a customer.

Figure 12A:
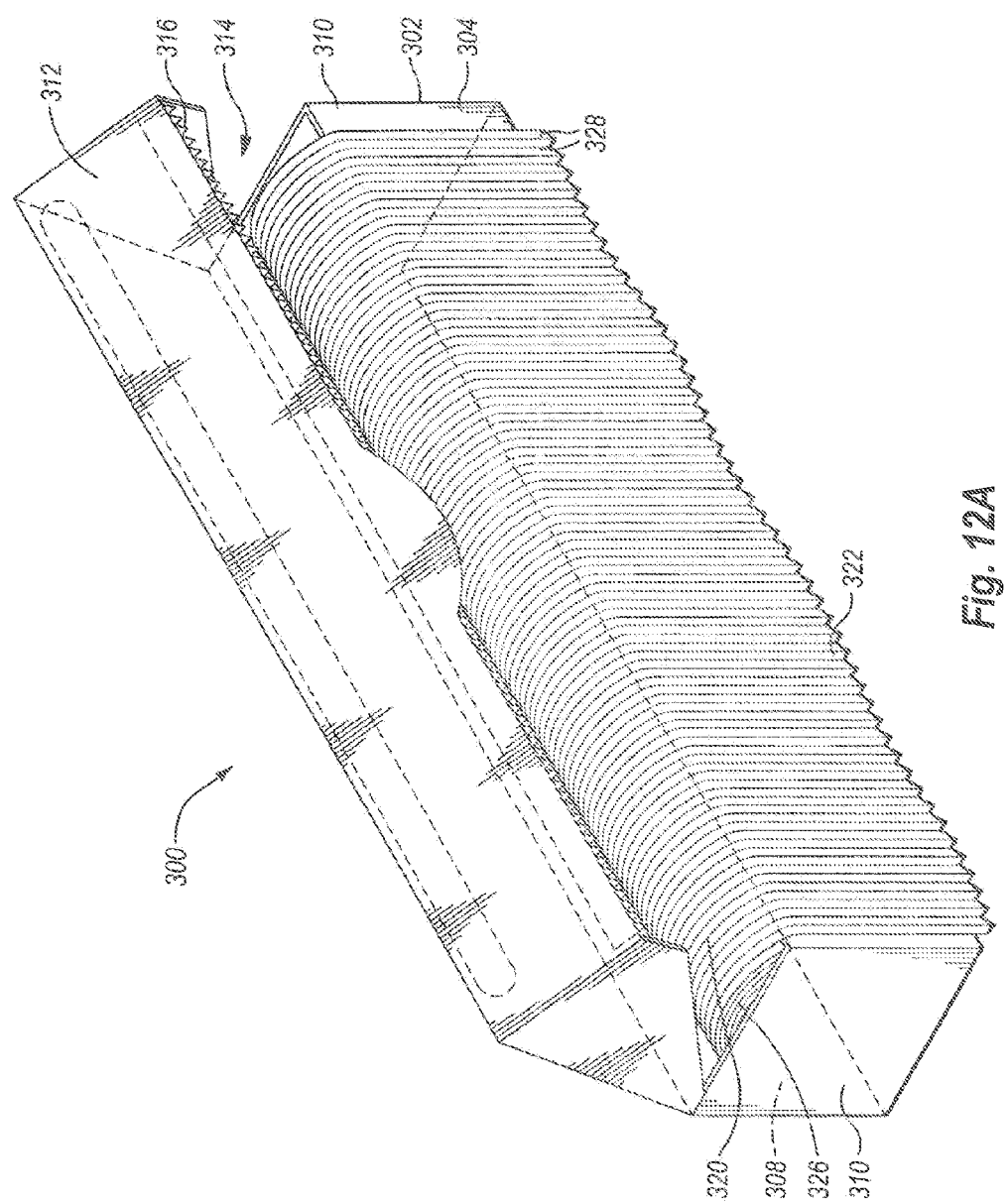
FIG. 12A is a perspective view of an incrementally-stretched film being withdrawn from a carton in accordance with one or more implementations of the present invention.

Referring to FIG. 12A, the dispensing container 300 comprises a carton 302 having a front panel 304, a bottom panel 306, a back panel 308, two side panels 310 and a lid 312. The carton 302 can have a lengthwise opening 314 and a lengthwise cutting strip 316 on the lid 312. The carton 302 contains a roll 320 of thermoplastic food wrap film 322 that has been incrementally stretched. The incrementally-stretched film 322 has a width 324 and a length extending around a paper core 326. The roll 320 of film 322 on the paper core 326 has a plurality of ribs 328 parallel to one another along the length of the film 322. When the film 322 is removed from the carton 302, the parallel ribs 328 are in perpendicular alignment with the cutting strip 316.

Figure 12B:
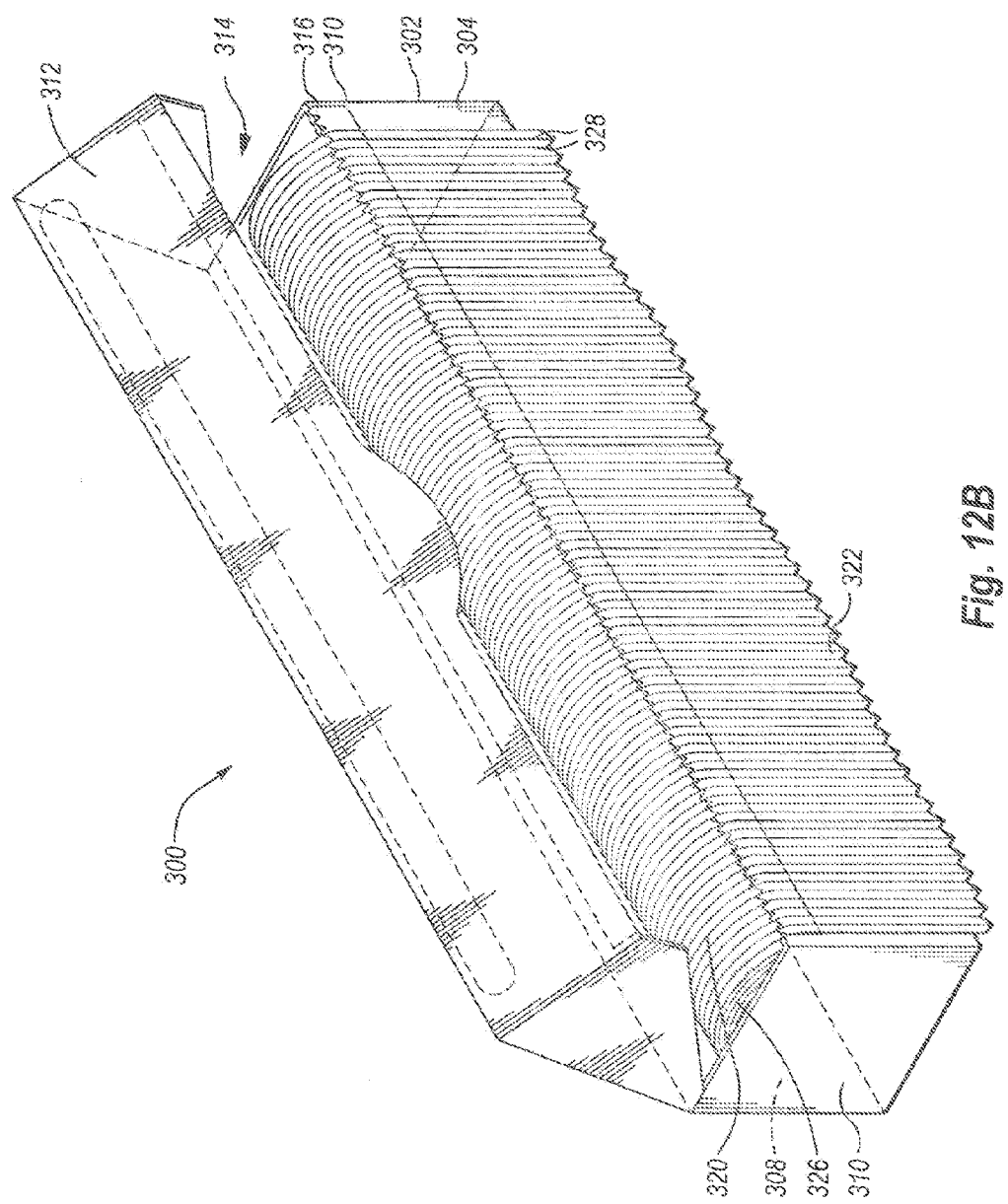
FIG. 12B is a perspective view of an incrementally-stretched film being withdrawn from another carton in accordance with one or more implementations of the present invention.

As shown in FIG. 12B, the dispensing container 300 comprises a carton 302 having a front panel 304, a bottom panel 306, a back panel 308, two side panels 310 and a lid 312, the carton 302 having a lengthwise opening 314 and a lengthwise cutting strip 316 on the front panel 304. The carton 302 contains a roll 320 of thermoplastic food wrap film 322. The film 322 has a width 324 and a length extending around a paper core 326. The roll 320 of film 322 on the paper core 326 has a plurality of ribs 328 parallel to one another along the length of the film 322. When the film 322 is removed from the carton 302, the parallel ribs 328 are in perpendicular alignment with the cutting strip 316.

Implementations of the present invention can also include methods of incrementally stretching a film of thermoplastic material to tailor the properties of the film for an intended use, such as use as food wrap. The following describes at least one implementation of a method with reference to the components and diagrams of FIGS. 1A through 12B. Of course, as a preliminary matter, one of ordinary skill in the art will recognize that the methods explained in detail herein can be modified to install a wide variety of configurations using one or more components of the present invention. For example, various acts of the method described can be omitted or expanded, and the order of the various acts of the method described can be altered as desired.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. An incrementally-stretched thermoplastic film formed by incrementally stretching an initial thermoplastic film having a first ratio of machine-direction tear resistance to transverse-direction tear resistance between 0.3 and 1.6, comprising:
    a thermoplastic material;
    a ribbed pattern including thicker ribs and thinner stretched linear sections extending across the incrementally-stretched thermoplastic film;
    a ratio of machine-direction tear resistance to transverse-direction tear resistance between 1.90 and 3.00 and that is between 1.5 and 4.9 times greater than the first ratio of machine-direction tear resistance to transverse-direction tear resistance of the initial thermoplastic film; and
    a gauge by weight that is between 0.91 and 0.53 times a first gauge by weight of the initial thermoplastic film.

2. The incrementally-stretched film as recited in claim 1, wherein the thicker ribs and thinner stretched linear sections further comprise a set of thicker ribs and thinner stretched linear sections extending across the incrementally-stretched thermoplastic film in a direction in which the incrementally-stretched thermoplastic film was extruded.

3. The incrementally-stretched film as recited in claim 2, wherein the thicker ribs and thinner stretched linear sections further comprise a second set of thicker ribs and thinner stretched linear sections extending across the incrementally-stretched thermoplastic film in a direction perpendicular to the direction in which the incrementally-stretched thermoplastic film was extruded.

4. The incrementally-stretched film as recited in claim 1, wherein the ratio of machine-direction tear resistance to transverse-direction tear resistance of the incrementally-stretched thermoplastic film is 1.5.

5. The incrementally-stretched film as recited in claim 4, wherein the ratio of machine-direction tear resistance to transverse-direction tear resistance of the incrementally-stretched thermoplastic film is greater than 2.

6. The incrementally-stretched film as recited in claim 1, wherein the gauge by weight of the incrementally-stretched thermoplastic film is between about 0.60 and about 0.91 times the first gauge by weight of the initial thermoplastic film.

7. The incrementally-stretched film as recited in claim 1, wherein the thermoplastic material comprises linear low density polyethylene.

8. The incrementally-stretched film as recited in claim 7, wherein the thermoplastic material further comprises low density polyethylene.

9. The incrementally-stretched film as recited in claim 1, wherein the incrementally-stretched thermoplastic film is a blown film.

10. The incrementally-stretched film as recited in claim 1, wherein the incrementally-stretched thermoplastic film is a cast film.

11. The film as recited in claim 1, wherein the thicker ribs and thinner stretched linear sections comprise:
    a first set of thicker ribs having a first width; and
    a second set of thicker ribs having a second width;
    wherein the second width is at least about two times the first width.

12. The incrementally-stretched thermoplastic film as recited in claim 1, wherein:
    the incrementally-stretched thermoplastic film comprises a transparent food wrap;

the incrementally-stretched thermoplastic film is a mono-layered film; and the incrementally-stretched thermoplastic film is liquid impermeable.

13. The incrementally-stretched thermoplastic film as recited in claim 1, wherein the incrementally-stretched thermoplastic film provides for easier dispensability from a roll than the initial thermoplastic film.

14. An incrementally-stretched thermoplastic film formed by incrementally stretching an initial thermoplastic film having a first ratio of machine-direction tear resistance to transverse-direction tear resistance between 0.3 and 1.6, comprising:
- a first set of alternating thicker ribs and thinner stretched linear sections extending across the thermoplastic film in a first direction parallel to a direction in which the thermoplastic film was extruded;
- a second set of alternating thicker ribs and thinner stretched linear sections extending across the thermoplastic film in a second direction transverse to the first direction;
- a machine direction tear resistance that is greater than a machine direction tear resistance of the initial thermoplastic film; and
- a transverse direction tear resistance that is less than a transverse direction tear resistance of the initial thermoplastic film;
- wherein a ratio of the machine direction tear resistance to the transverse direction tear resistance between 1.90 and 3.00 and that is between 1.5 and 4.9 times greater than the first ratio of machine-direction tear resistance to transverse-direction tear resistance of the initial thermoplastic film;
- wherein a gauge by weight that is between 0.91 and 0.53 times a first gauge by weight of the initial thermoplastic film.

15. The incrementally-stretched thermoplastic film as recited in claim 14, wherein the ratio of the machine direction tear resistance to the transverse direction tear resistance is greater than about 2.

16. The incrementally-stretched thermoplastic film as recited in claim 15, wherein the ratio of the machine direction tear resistance to the transverse direction tear resistance is greater than about 2.5.

17. The incrementally-stretched thermoplastic film as recited in claim 15, wherein the gauge by weight of the incrementally-stretched thermoplastic film is 0.61 times the first gauge by weight of the initial thermoplastic film.

18. The incrementally-stretched thermoplastic film as recited in claim 14, wherein the incrementally-stretched thermoplastic film is a blown film.

19. The incrementally-stretched thermoplastic film as recited in claim 14, wherein the incrementally-stretched thermoplastic film is a cast film.

20. The incrementally-stretched thermoplastic film as recited in claim 14, wherein:
- the incrementally-stretched thermoplastic film comprises a transparent food wrap;
- the incrementally-stretched thermoplastic film is a mono-layered film; and
- the incrementally-stretched thermoplastic film is gas impermeable.

* * * * *